United States Patent
Matsui et al.

(10) Patent No.: US 8,006,509 B2
(45) Date of Patent: Aug. 30, 2011

(54) HUMIDITY CONTROL SYSTEM

(75) Inventors: Nobuki Matsui, Osaka (JP); Satoshi Ishida, Osaka (JP); Tomohiro Yabu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 901 days.

(21) Appl. No.: 11/921,955

(22) PCT Filed: Jun. 16, 2006

(86) PCT No.: PCT/JP2006/312180
§ 371 (c)(1),
(2), (4) Date: Dec. 11, 2007

(87) PCT Pub. No.: WO2006/135068
PCT Pub. Date: Dec. 21, 2006

(65) Prior Publication Data
US 2009/0308099 A1  Dec. 17, 2009

(30) Foreign Application Priority Data

Jun. 17, 2005  (JP) .............................. 2005-178451

(51) Int. Cl.
*F25D 23/00* (2006.01)
(52) U.S. Cl. ........................................................ 62/271

(58) Field of Classification Search ................... 62/271, 62/476, 477
See application file for complete search history.

(56) References Cited

U.S. PATENT DOCUMENTS

| | | | | |
|---|---|---|---|---|
| 7,201,013 B2 * | 4/2007 | Yabu | ............................... | 62/271 |
| 2007/0089608 A1 * | 4/2007 | Yabu | ............................... | 96/108 |

FOREIGN PATENT DOCUMENTS

| | | |
|---|---|---|
| JP | 61-211674 A | 9/1986 |
| JP | 7-98162 A | 4/1995 |
| JP | 2004-294048 A | 10/2004 |
| JP | 2005-55165 A | 3/2005 |
| JP | 2005-315463 A | 11/2005 |

* cited by examiner

*Primary Examiner* — Melvin Jones
(74) *Attorney, Agent, or Firm* — Birch, Stewart, Kolasch & Birch, LLP

(57) ABSTRACT

A humidity control system (10) includes a refrigerant circuit (50) in which an adsorption heat exchanger (51, 52) carrying an adsorbent thereon is connected. During a regeneration action of a humidification operation of the humidity control system (10), outdoor air passes through the adsorption heat exchanger (51, 52) from upstream towards downstream in the flow of refrigerant. Therefore, the air can be effectively increased in temperature at the air inflow end of the adsorption heat exchanger (51, 52), thereby preventing freezing of dew condensation water.

6 Claims, 17 Drawing Sheets

FIG. 2A  First mode

FIG. 2B  Second mode

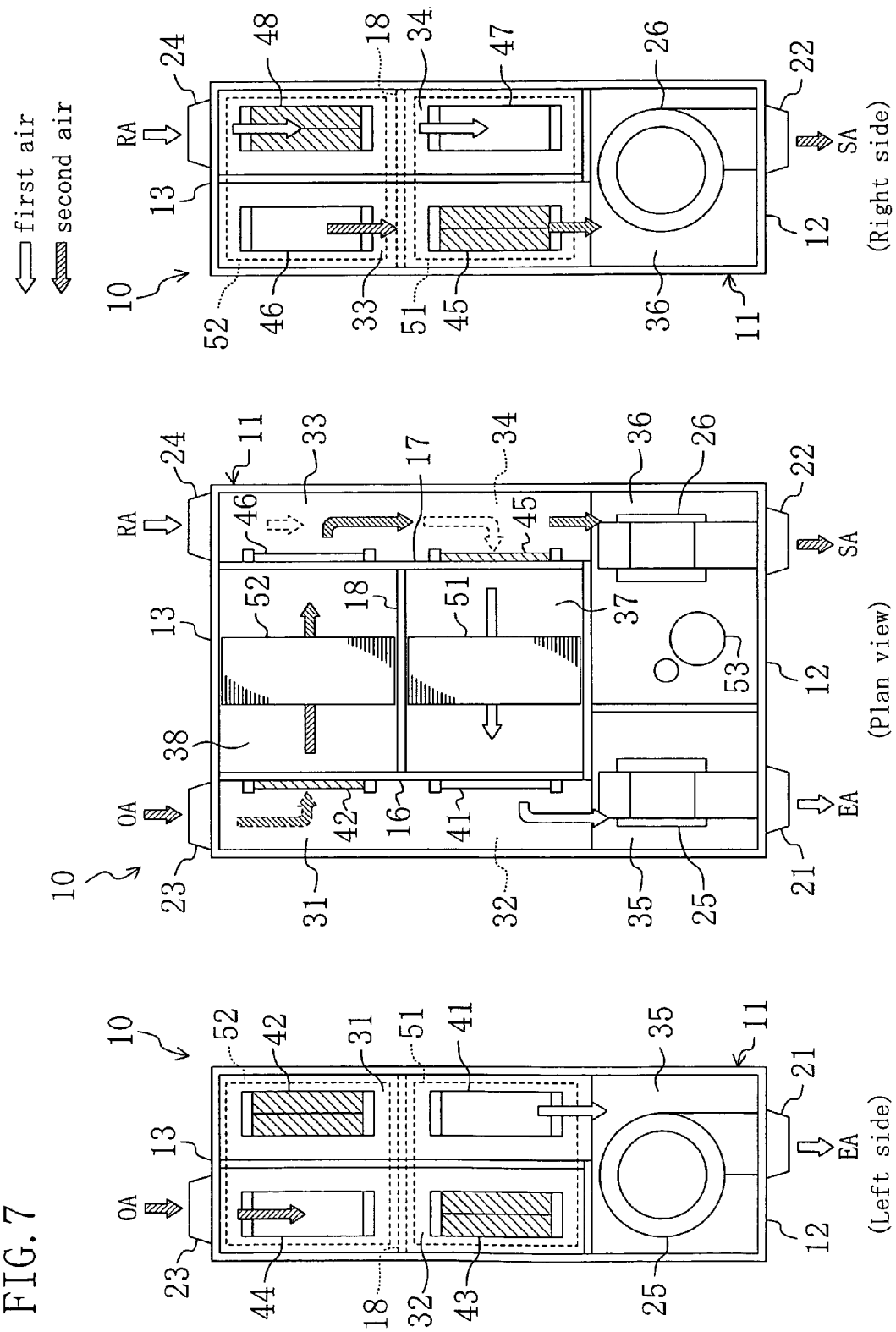

evaporator condenser evaporator condenser

HUMIDITY CONTROL SYSTEM

TECHNICAL FIELD

This invention relates to humidity control systems including an adsorption heat exchanger carrying an adsorbent thereon and particularly relates to humidity control systems capable of regenerating the adsorbents on their adsorption heat exchangers by bringing them into contact with air.

BACKGROUND ART

Humidity control systems are conventionally known that control the humidity of a room by adsorbing and desorbing moisture in air.

For example, Patent Document 1 discloses a humidity control system including a refrigerant circuit in which adsorption heat exchangers each carrying an adsorbent thereon are connected. In the refrigerant circuit of the humidity control system, a compressor, a first adsorption heat exchanger, an expansion valve, a second adsorption heat exchanger and a four-way selector valve are connected. The refrigerant circuit operates in a refrigeration cycle by circulating refrigerant therethrough. Out of the two adsorption heat exchangers, one serves as an evaporator and the other serves as a condenser. The adsorption heat exchanger serving as an evaporator performs an adsorption action of adsorbing moisture in air to the adsorbent, while the adsorption heat exchanger serving as a condenser performs a regeneration action of releasing moisture in the adsorbent to air.

Specifically, during a humidification operation of the humidity control system, outdoor air passes through the adsorption heat exchanger serving as a condenser. In this adsorption heat exchanger, the adsorbent is heated by the refrigerant and moisture is thereby desorbed from the adsorbent and released to the outdoor air. The air humidified by this regeneration action is supplied as supply air to a room to humidify the room. On the other hand, room air passes through the adsorption heat exchanger serving as an evaporator. In this adsorption heat exchanger, the adsorbent is cooled by the refrigerant and moisture in the air is thereby adsorbed to the adsorbent. The air having given moisture to the adsorbent by this adsorption action is exhausted as exhaust air to the outside.

Furthermore, during a dehumidification operation of the humidity control system, outdoor air passes through the adsorption heat exchanger serving as an evaporator. In this adsorption heat exchanger, the adsorbent is cooled by the refrigerant and moisture in the air is thereby adsorbed to the adsorbent. The air dehumidified by this adsorption action is supplied as supply air to the room to dehumidify the room. On the other hand, room air passes through the adsorption heat exchanger serving as a condenser. In this adsorption heat exchanger, the adsorbent is heated by the refrigerant and moisture is thereby desorbed from the adsorbent and released to the air. The air used for regeneration of the adsorbent by this regeneration action is exhausted as exhaust air to the outside.

In this humidity control system, the regeneration action and the adsorption action are alternately repeated in each of the two adsorption heat exchangers by switching the air flow path with dampers and concurrently switching the direction of refrigerant circulation in the refrigerant circuit with the four-way selector valve. Thus, according to this humidity control system, humidity-controlled air is continuously supplied to the room without impairing the adsorption and regeneration capacities of the adsorbents.

Patent Document 1: Published Japanese Patent Application No. 2004-294048

DISCLOSURE OF THE INVENTION

Problem To Be Solved By the Invention

As described previously, during the humidification operation of the humidity control system in Patent Document 1, outdoor air passes through the adsorption heat exchanger serving as a condenser. Therefore, when extremely low-temperature outdoor air passes through the above adsorption heat exchanger such as in winter, moisture having condensed into dew around the adsorption heat exchanger may freeze on the surface of the adsorbent. The moisture having frozen on the surface of the adsorbent gradually melts by heat from the refrigerant flowing in the adsorption heat exchanger serving as a condenser. However, if such moisture freezing and melting on the adsorbent surface are repeated, the adsorbent might gradually deteriorate and in turn peel off from the surface of the adsorption heat exchanger.

The present invention has been made in view of the foregoing point and, therefore, an object of the invention is, in a humidity control system including an adsorption heat exchanger carrying an adsorbent thereon, to avoid that when extremely low-temperature air passes through the adsorption heat exchanger during the regeneration action, dew condensation water freezes on the adsorbent surface.

Means To Solve the Problem

A first aspect of the invention is directed to a humidity control system that includes a heat transfer medium circuit (50) filled with heat transfer medium flowing therethrough and an adsorption heat exchanger (51, 52) connected in the heat transfer medium circuit (50) and carrying an adsorbent thereon and is configured to perform a regeneration action of heating the adsorbent on the adsorption heat exchanger (51, 52) with the heat transfer medium in the heat transfer medium circuit (50) and bringing the adsorbent into contact with air to release moisture in the adsorbent to the air. Furthermore, the adsorption heat exchanger (51, 52) in the humidity control system is configured so that, during the regeneration action, the air flows from a side thereof into which the heat transfer medium flows towards a side thereof out of which the heat transfer medium flows.

In the first aspect of the invention, an adsorbent for adsorbing and desorbing moisture in air is carried on the adsorption heat exchanger (51, 52). During the regeneration action of the humidity control system, the adsorbent is heated by the heat transfer medium flowing in the heat transfer medium circuit (50). When air comes into contact with the heated adsorbent, moisture adsorbed to the adsorbent is released to the air. As a result, the adsorption capacity of the adsorbent is recovered and, for example, the air is supplied to a room to humidify the room.

In this case, in the adsorption heat exchanger (51, 52) during the regeneration action, the air flows from a side thereof into which the heat transfer medium flows towards a side thereof out of which the heat transfer medium flows, thereby providing so-called parallel flows of air and heat transfer medium. Therefore, in the adsorption heat exchanger (51, 52) during the regeneration action, relatively high-temperature heat transfer medium flows in the air inflow end thereof. In other words, the heat transfer medium flowing in the air inflow end of the adsorption heat exchanger (51, 52) has a higher temperature than when air and heat transfer medium form so-called counter flows. Hence, air can be effectively increased in temperature at the air inflow end of the adsorption heat exchanger (51, 52) by the heat transfer medium.

In a second aspect of the invention, related to the first aspect of the invention, the humidity control system is configured to perform an adsorption action of cooling the adsorbent on the adsorption heat exchanger (51, 52) with the heat transfer medium and bringing the adsorbent into contact with air to adsorb moisture in the air to the adsorbent, and the adsorption heat exchanger (51, 52) is configured so that, during the adsorption action, the air flows from a side thereof into which the heat transfer medium flows towards a side thereof out of which the heat transfer medium flows.

During the adsorption action of the humidity control system according to the second aspect, moisture is adsorbed to the adsorbent of the adsorption heat exchanger (51, 52). Heat of adsorption produced during the moisture adsorption is taken by the heat transfer medium flowing in the heat transfer medium circuit (50). As a result, moisture is stored in the adsorbent and, for example, the air is supplied to a room to dehumidify the room.

In this case, in the adsorption heat exchanger (51, 52) during the adsorption action, the air flows from a side thereof into which the heat transfer medium flows towards a side thereof out of which the heat transfer medium flows, thereby providing so-called parallel flows of air and heat transfer medium. Therefore, the temperature difference between air and heat transfer medium at the air inflow end of the adsorption heat exchanger (51, 52) becomes larger than when air and heat transfer medium form so-called counter flows. Hence, air can be effectively reduced in temperature at the air inflow end of the adsorption heat exchanger (51, 52).

In a third aspect of the invention, related to the first aspect of the invention, the humidity control system is configured to perform an adsorption action of cooling the adsorbent on the adsorption heat exchanger (51, 52) with the heat transfer medium and bringing the adsorbent into contact with air to adsorb moisture in the air to the adsorbent, and the adsorption heat exchanger (51, 52) is configured so that, during the adsorption action, the air flows from a side thereof out of which the heat transfer medium flows towards a side thereof into which the heat transfer medium flows.

According to the third aspect of the invention, in the adsorption heat exchanger (51, 52) in which the adsorption action is performed, the air flows from a side thereof into which the heat transfer medium flows towards a side thereof out of which the heat transfer medium flows, thereby providing so-called counter flows of air and heat transfer medium. Therefore, temperature difference between air and heat transfer medium can be ensured over the entire region of air flow in the adsorption heat exchanger (51, 52) from upstream end to downstream end thereof. As a result, the air cooling effect of the adsorption heat exchanger (51, 52) can be enhanced.

In a fourth aspect of the invention, related to any one of the first to third aspects of the invention, the heat transfer medium circuit comprises a refrigerant circuit (50) operating in a refrigeration cycle by circulating refrigerant therethrough.

In the fourth aspect of the invention, the adsorption heat exchanger (51, 52) is connected in the refrigerant circuit (50) serving as the heat transfer medium circuit. Since the refrigerant circuit (50) operates in a refrigeration cycle by circulating refrigerant therethrough, the adsorption heat exchanger (51, 52) serves as a condenser or an evaporator. During the regeneration action of the humidity control system, air comes into contact with the adsorbent heated by the refrigerant in the adsorption heat exchanger (51, 52) servings as a condenser. As a result, moisture adsorbed to the adsorbent is released to the air. Furthermore, during the adsorption action of the humidity control system, air comes into contact with the adsorbent cooled by the refrigerant in the adsorption heat exchanger (51, 52) serving as an evaporator. As a result, moisture in the air is adsorbed to the adsorbent.

EFFECTS OF THE INVENTION

In the present invention, air flows through the adsorption heat exchanger (51, 52) during the regeneration action from a side thereof into which the heat transfer medium flows towards a side thereof out of which the heat transfer medium flows. Therefore, according to the present invention, the air can be effectively increased in temperature at the air inflow end of the adsorption heat exchanger (51, 52). Thus, even when extremely low-temperature outdoor air passes through the adsorption heat exchanger (51, 52) such as in winter, the outdoor air can be increased to a relatively high temperature at the air inflow end of the adsorption heat exchanger (51, 52). Therefore, dew condensation water can be prevented from freezing on the surface of the adsorbent on the adsorption heat exchanger (51, 52), thereby preventing the adsorbent from being deteriorated and from peeling off from the adsorption heat exchanger (51, 52).

In the second aspect of the invention, air flows through the adsorption heat exchanger (51, 52) during the adsorption action from a side thereof into which the heat transfer medium flows towards a side thereof out of which the heat transfer medium flows. Therefore, according to the second aspect, the air can be effectively reduced in temperature at the air inflow end of the adsorption heat exchanger (51, 52). Thus, the air temperature can be reduced to smaller than the dew point at the air inflow side of the adsorption heat exchanger (51, 52) to condense moisture in the air into dew and dehumidify the air. Therefore, the dehumidification capacity of the humidity control system can be enhanced. Hence, even if air cannot be well dehumidified only by the dehumidification capacity of the adsorbent, moisture can be condensed in dew to compensate for the shortage of the dehumidification capacity of the adsorbent.

According to the third aspect of the invention, air flows through the adsorption heat exchanger (51, 52) during the adsorption action from a side thereof out of which the heat transfer medium flows towards a side thereof into which the heat transfer medium flows. Therefore, according to the third aspect, the air cooling effect of the adsorption heat exchanger (51, 52) can be enhanced. Hence, the air can be effectively cooled and dehumidified by the adsorption heat exchanger (51, 52) during the adsorption action, whereby room can be effectively cooled, for example, during a dehumidification operation in summer.

According to the fourth aspect of the invention, the refrigerant circuit (50) operable in a refrigeration cycle is used as the heat transfer medium circuit. Therefore, the adsorbent can be effectively cooled by refrigerant evaporating in the adsorption heat exchanger (51, 52), thereby enhancing the adsorption capacity of the adsorbent. Furthermore, the adsorbent can be effectively heated by refrigerant condensing in the adsorption heat exchanger (51, 52), thereby enhancing the regeneration capacity of the adsorbent.

BRIEF DESCRIPTION OF DRAWINGS

FIG. 2 shows piping diagrams showing the configuration of a refrigerant circuit in Embodiment 1, wherein FIG. 2A illustrates the behavior during a first mode and FIG. 2B illustrates the behavior during a second mode.

FIG. 7 shows schematic structural diagrams of the humidity control system, illustrating the air flow during the second mode of the humidification operation.

FIG. 8 shows schematic structural diagrams of the adsorption heat exchanger in Embodiment 1, illustrating the relation between air flow and refrigerant flow during the dehumidification operation, wherein

FIG. 9 shows schematic structural diagrams of the adsorption heat exchanger in Embodiment 1, illustrating the relation between air flow and refrigerant flow during the humidification operation, wherein

FIG. 15 shows schematic structural diagrams of an adsorption heat exchanger in Embodiment 2, illustrating the relation between air flow and refrigerant flow during the dehumidification operation, wherein

FIG. 16 shows schematic structural diagrams of the adsorption heat exchanger in Embodiment 2, illustrating the relation between air flow and refrigerant flow during the humidification operation, wherein

FIG. 17 shows piping diagrams showing the configuration of a refrigerant circuit in a modification of Embodiment 2, wherein

FIG. 18 shows schematic structural diagrams of the adsorption heat exchanger in the modification of Embodiment 2, illustrating the relation between air flow and refrigerant flow during the dehumidification operation, wherein

FIG. 19 shows schematic structural diagrams of the adsorption heat exchanger in the modification of Embodiment 2, illustrating the relation between air flow and refrigerant flow during the humidification operation, wherein

LIST OF REFERENCE NUMERALS

10 humidity control system
50 refrigerant circuit (heat transfer medium circuit)
51, 52 adsorption heat exchanger

BEST MODE FOR CARRYING OUT THE INVENTION

Hereinafter, embodiments of the invention will be described in detail with reference to the drawings.

Embodiment 1 of the Invention

Embodiment 1 of the invention is described. A humidity control system (10) according to this embodiment is a humidity control system capable of performing air dehumidification and humidification. The humidity control system (10) is a so-called ventilation type humidity control system in which outdoor air (OA) is humidity-controlled and then supplied to a room and concurrently room air (RA) is exhausted to the outside.

<General Structure of Humidity Control System>

Figure 1:
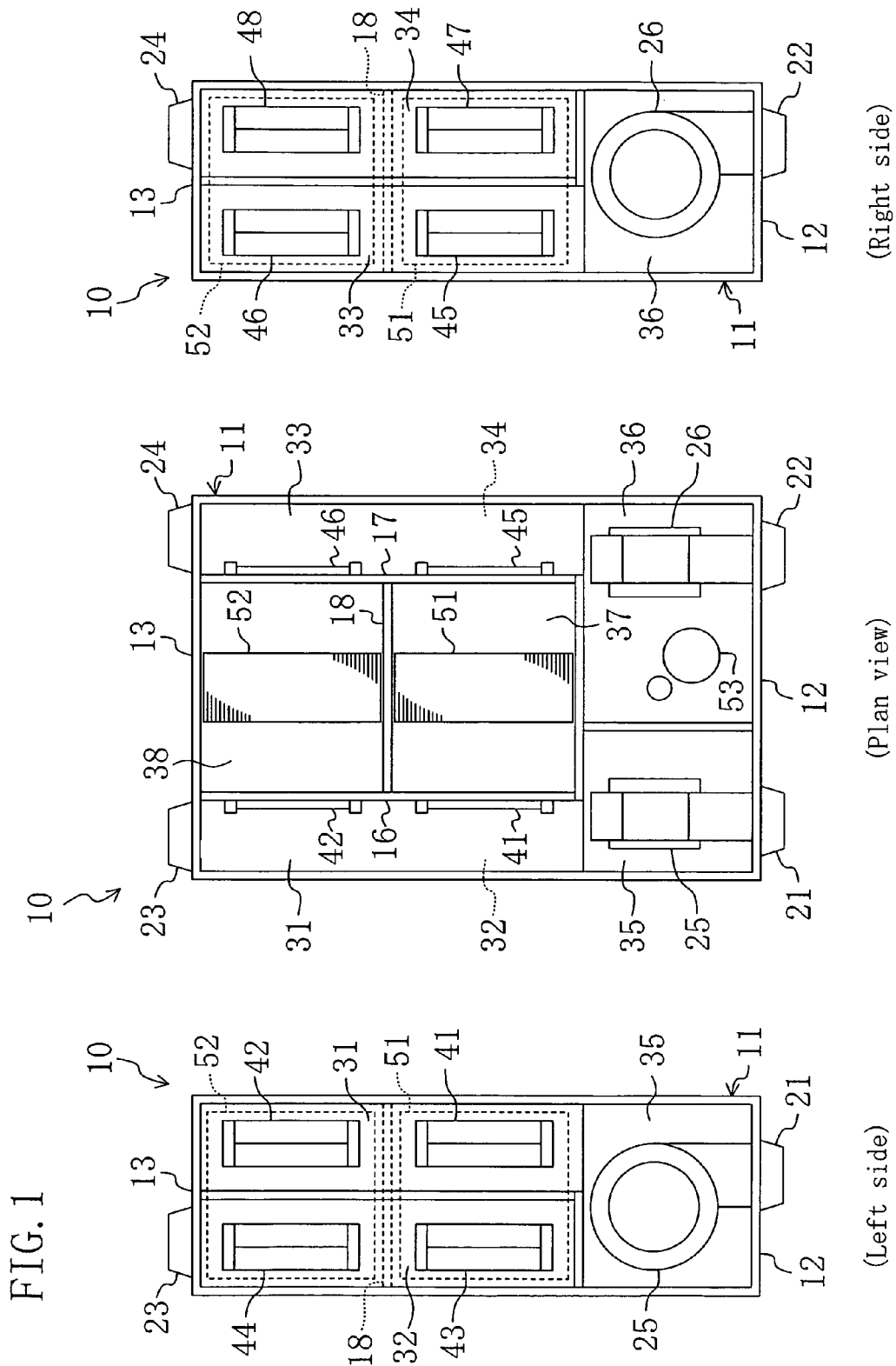
FIG. 1 shows structural diagrams showing a schematic structure of a humidity control system according to Embodiment 1 in plan, right side and left side views.

The humidity control system (10) is described with reference to FIG. 1. Note that the following terms employed herein, "upper", "lower", "left", "right", "front", "rear", "on the front of" and "behind", refer to directionalities when the humidity control system (10) is viewed from the front, unless otherwise specified.

The humidity control system (10) includes a casing (11). The casing (11) contains a refrigerant circuit (50). In the refrigerant circuit (50), a first adsorption heat exchanger (51), a second adsorption heat exchanger (52), a compressor (53), a four-way selector valve (54) and a motor-operated expansion valve (55) are connected. The details of the refrigerant circuit (50) will be described later.

The casing (11) is formed in a flattish, relatively small-height, rectangular parallelepiped shape. In the casing (11), a front panel (12) and a rear panel (13) stand up at the front and rear sides, respectively, of the casing (11) as viewed in FIG. 1. The direction from front to rear in the figure is the longitudinal direction of the casing (11).

The front panel (12) of the casing (11) has an exhaust opening (21) open at a position thereof towards the left side of the casing (11) and an air supply opening (22) open at a position thereof towards the right side of the casing (11). The rear panel (13) of the casing (11) has an outdoor air suction opening (23) open at a position thereof towards the left side of the casing (11) and an indoor air suction opening (24) open at a position thereof towards the right side of the casing (11).

The interior space of the casing (11) is divided into a part towards the front panel (12) and a part towards the rear panel (13).

The space towards the front panel (12) in the interior of the casing (11) is further divided from left to right into two spaces. In the space divided into left and right spaces, the left space forms an exhaust fan chamber (35) and the right space forms an air supply fan chamber (36). The exhaust fan chamber (35) is communicated through the exhaust opening (21) with the outside. The exhaust fan chamber (35) contains an exhaust fan (25) of which the air outlet is connected to the exhaust opening (21). On the other hand, the air supply fan chamber (36) is communicated through the air supply opening (22) with the room. The air supply fan chamber (36) contains an air supply fan (26) of which the air outlet is connected to the air supply opening (22). The air supply fan chamber (36) also contains the compressor (53).

On the other hand, the space towards the rear panel (13) in the interior of the casing (11) is further divided from left to right into three spaces by a first partition plate (16) and a second partition plate (17). These partition plates (16, 17) extend from the rear panel (13) along the longitudinal direction of the casing (11). The first partition plate (16) and the second partition plate (17) are disposed towards the right and left side plates, respectively, of the casing (11).

In the interior of the casing (11), the space on the left side of the first partition plate (16) is divided from top to bottom into two subspaces. The upper subspace forms an exhaust-side passage (31) and the lower subspace forms an outdoor air-side passage (32). The exhaust-side passage (31) is communicated with the exhaust fan chamber (35). The outdoor air-side passage (32) is communicated through the outdoor air suction opening (23) with the outside. On the other hand, the space on the right side of the first partition plate (16) is divided from top to bottom into two subspaces. The upper subspace forms an air supply-side passage (33) and the lower subspace forms an indoor air-side passage (34). The air supply-side passage (33) is communicated with the air supply fan chamber (36). The indoor air-side passage (34) is communicated through the indoor air suction opening (24) with the room.

The space between the first partition plate (16) and the second partition plate (17) is further divided from front to rear into two subspaces by a middle partition plate (18). The subspace on the front of the middle partition plate (18) forms a first heat exchanger chamber (37) and the subspace on the rear of the middle partition plate (18) forms a second heat exchanger chamber (38). The first heat exchanger chamber (37) contains the first adsorption heat exchanger (51) and the second heat exchanger chamber (38) contains the second adsorption heat exchanger (52). These two adsorption heat exchangers (51, 52) are placed to extend transversely across the heat exchanger chambers (37, 38) containing them.

The first partition plate (16) is provided with four on-off dampers (41-44). Specifically, the first damper (41) is attached to an upper portion of the first partition plate (16) towards the front, the second damper (42) is attached to an upper portion thereof towards the rear, the third damper (43) is attached to a lower portion thereof towards the front, and the fourth damper (44) is attached to a lower portion thereof towards the rear. When the first damper (41) is turned open, the exhaust-side passage (31) is communicated with the first heat exchanger chamber (37). When the second damper (42) is turned open, the exhaust-side passage (31) is communicated with the second heat exchanger chamber (38). When the third damper (43) is turned open, the outdoor air-side passage (32) is communicated with the first heat exchanger chamber (37). When the fourth damper (44) is turned open, the outdoor air-side passage (32) is communicated with the second heat exchanger chamber (38).

The second partition plate (17) is provided with four on-off dampers (45-48). Specifically, the fifth damper (45) is attached to an upper portion of the second partition plate (17) towards the front, the sixth damper (46) is attached to an upper portion thereof towards the rear, the seventh damper (47) is attached to a lower portion thereof towards the front, and the eighth damper (48) is attached to a lower portion thereof towards the rear. When the fifth damper (45) is turned open, the air supply-side passage (33) is communicated with the first heat exchanger chamber (37). When the sixth damper (46) is turned open, the air supply-side passage (33) is communicated with the second heat exchanger chamber (38). When the seventh damper (47) is turned open, the indoor air-side passage (34) is communicated with the first heat exchanger chamber (37). When the eighth damper (48) is turned open, the indoor air-side passage (34) is communicated with the second heat exchanger chamber (38).

<Configuration of Refrigerant Circuit>

Figure 2:
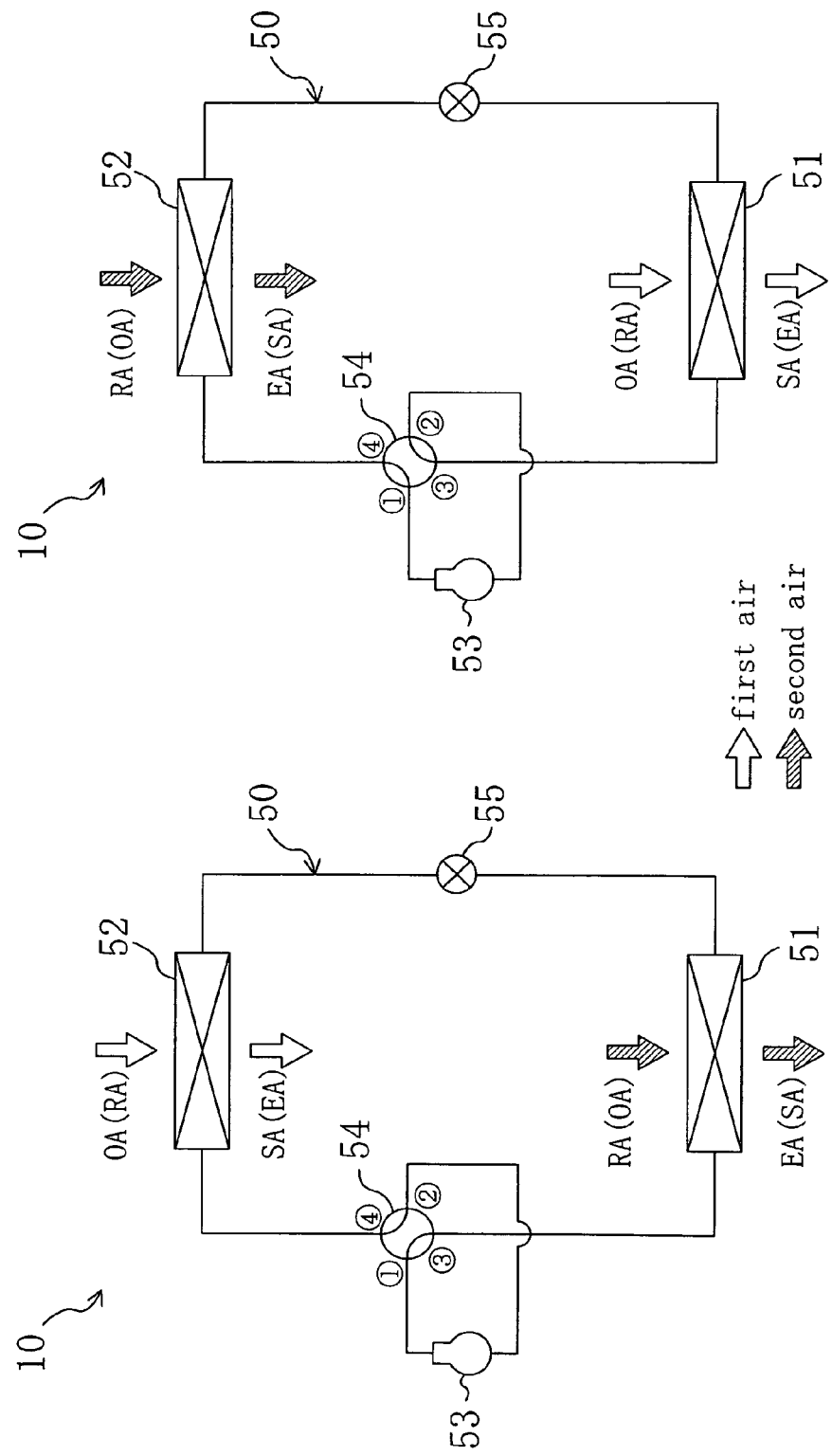

The refrigerant circuit (50) is described with reference to FIG. 2.

The refrigerant circuit (50) is a closed circuit that includes a first adsorption heat exchanger (51), a second adsorption heat exchanger (52), a compressor (53), a four-way selector valve (54) and a motor-operated expansion valve (55). The refrigerant circuit (50) operates in a vapor compression refrigeration cycle by circulating therethrough refrigerant with which the refrigerant circuit (50) is filled. In other words, the refrigerant circuit (50) constitutes a heat transfer medium circuit through which refrigerant serving as a heat transfer medium flows.

In the refrigerant circuit (50), the compressor (53) is connected at its discharge side to a first port of the four-way selector valve (54) and connected at its suction side to a second port of the four-way selector valve (54). One end of the first adsorption heat exchanger (51) is connected to a third port of the four-way selector valve (54). The other end of the first adsorption heat exchanger (51) is connected via the motor-operated expansion valve (55) to one end of the second adsorption heat exchanger (52). The other end of the second adsorption heat exchanger (52) is connected to a fourth port of the four-way selector valve (54).

The four-way selector valve (54) is switchable between a first position in which the first and third ports are communicated with each other and the second and fourth ports are communicated with each other (the position shown in FIG. 2A) and a second position in which the first and fourth ports are communicated with each other and the second and third ports are communicated with each other (the position shown in FIG. 2B).

Figure 3:
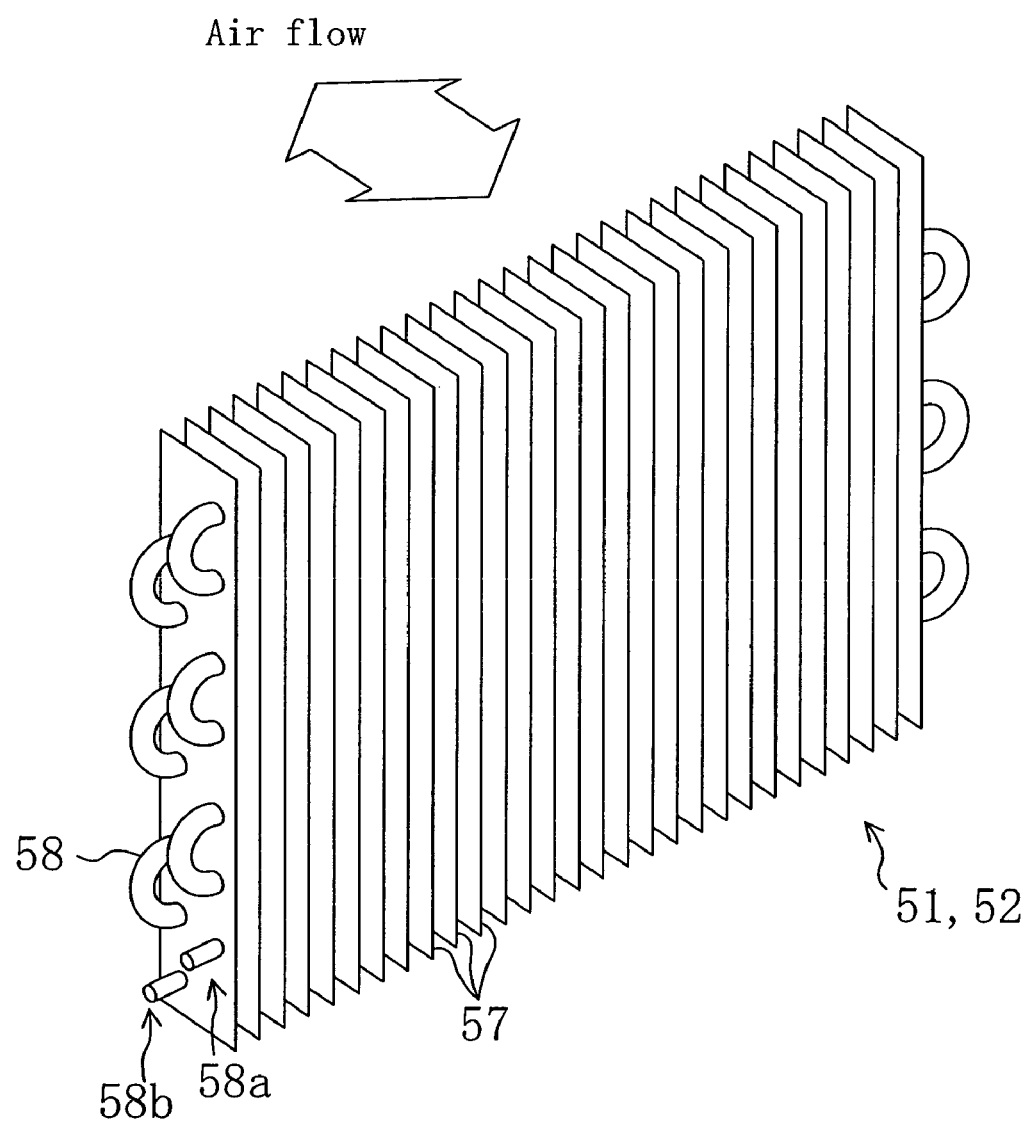
FIG. 3 is a schematic perspective view of an adsorption heat exchanger.

As shown in FIG. 3, each of the first adsorption heat exchanger (51) and the second adsorption heat exchanger (52) is formed of a cross fin type fin-and-tube heat exchanger. Each adsorption heat exchanger (51, 52) includes fins (57) made of aluminium and a heat exchange tube (58) made of copper. Each fin (57) is formed in the shape of an elongated rectangular plate. The fins (57) are aligned at regular intervals in a direction orthogonal to air flow passing through each adsorption heat exchanger (51, 52).

The heat exchange tube (58) is provided to pass through the fins (57). The heat exchange tube (58) is composed of a first heat exchange tube part (58a) and a second heat exchange tube part (58b) that are arranged in two rows in the direction of air flow. The heat exchange tube parts (58a, 58b) meander to pass through each fin (57) at a plurality of points and their straight portions are juxtaposed in a longitudinal direction of the fins (57).

One end of the first heat exchange tube part (58a) is located at a lower right part of one of the fins (57) and connected to the refrigerant piping of the refrigerant circuit (50). The other end of the first heat exchange tube part (58a) is located at an upper right part of the fin (57). One end of the second heat exchange tube part (58b) is located at an upper left part of the fin (57) and connected to the other end of the first heat exchange tube part (58a). The other end of the second heat exchange tube part (58b) is located at a lower left part of the fin (57) and connected to the refrigerant piping of the refrigerant circuit (50).

In each adsorption heat exchanger (51, 52), an adsorbent is carried on the surface of each fin (57) and, thus, air passing through between each adjacent pair of fins (57) comes into contact with the adsorbent on the surfaces of the fins (57). Examples of materials applicable as the adsorbent include materials that can adsorb vapor in air, such as zeolite, silica gel, activated carbon and organic polymeric materials with hydrophilic functional groups.

Each adsorption heat exchanger (51, 52) having the above structure stands up in the associated heat exchanger chamber (37, 38) so that its first heat exchange tube part (58a) is located towards the above-described air supply-side passage (33) and indoor air-side passage (34) and its second heat exchange tube part (58b) is located towards the above-described exhaust-side passage (31) and outdoor air-side passage (32).

Operational Behavior

The humidity control system (10) of this embodiment performs a dehumidification operation and a humidification operation. The humidity control system (10) during the dehumidification operation and the humidification operation controls the humidity of outdoor air (OA) taken therein and supplies the controlled air as supply air (SA) to a room and, concurrently, exhausts room air (RA) taken therein as exhaust air (EA) to the outside. In short, the humidity control system (10) during the dehumidification operation and the humidification operation ventilates the room.

<Dehumidification Operation>

In the humidity control system (10) during dehumidification operation, the air supply fan (26) and the exhaust fan (27) are driven. When the air supply fan (26) is driven, outdoor air is taken as a first air through the outdoor air suction opening (23) into the casing (11). When the exhaust fan (25) is driven, room air is taken as a second air through the indoor air suction opening (24) into the casing (11). Furthermore, in the humidity control system (10) during dehumidification operation, first and second modes are alternately repeated at specified time intervals (for example, every three minutes).

A description is given of the first mode of the dehumidification operation.

In the refrigerant circuit (50) during the first mode, as shown in FIG. 2A, the four-way selector valve (54) is set to the first position. The refrigerant circuit (50) in this state circulates refrigerant therethrough to operate in a refrigeration cycle. In the refrigerant circuit (50) during this mode, refrigerant discharged from the compressor (53) flows through the first adsorption heat exchanger (51), the motor-operated expansion valve (55) and the second adsorption heat exchanger (52) in this order, the first adsorption heat exchanger (51) serves as a condenser and the second adsorption heat exchanger (52) serves as an evaporator.

Figure 4:
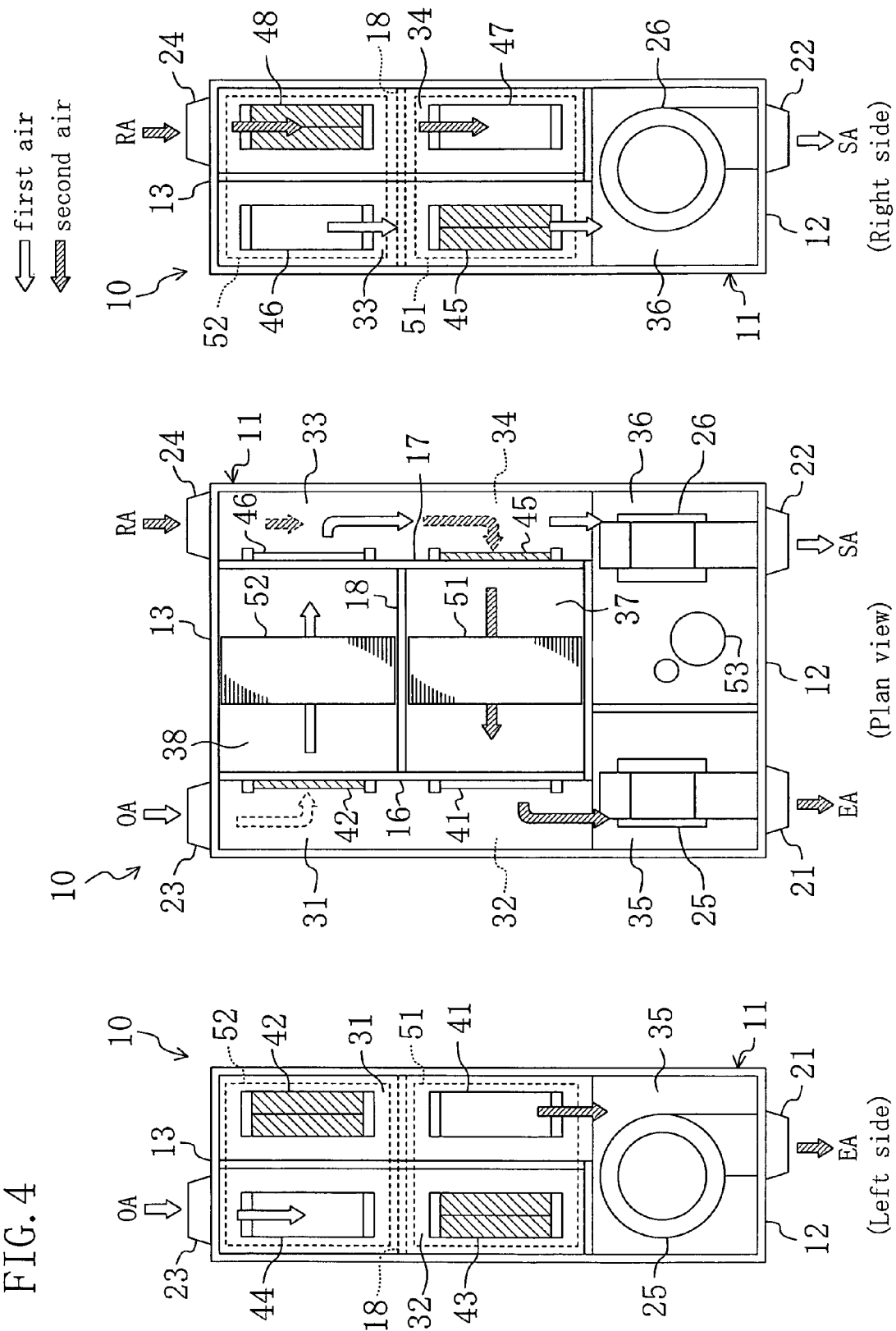
FIG. 4 shows schematic structural diagrams of the humidity control system, illustrating the air flow during the first mode of a dehumidification operation.

During the first mode, as shown in FIG. 4, the first damper (41), the fourth damper (44), the sixth damper (46) and the seventh damper (47) are open and the rest (42, 43, 45, 48) are closed.

The first air having flowed through the outdoor air suction opening (23) into the outdoor air-side passage (32) flows through the fourth damper (44) into the second heat exchanger chamber (38) and then passes through the second adsorption heat exchanger (52). In the second adsorption heat exchanger (52), moisture in the first air is adsorbed by the adsorbent and heat of adsorption produced during the moisture adsorption is taken by the refrigerant. In other words, the second adsorption heat exchanger (52) performs an adsorption action. The first air dehumidified by the second adsorption heat exchanger (52) flows through the sixth damper (46) into the air supply-side passage (33), passes through the air supply fan chamber (36) and is then supplied through the air supply opening (22) to the room.

On the other hand, the second air having flowed through the indoor air suction opening (24) into the indoor air-side passage (34) flows through the seventh damper (47) into the first heat exchanger chamber (37) and then passes through the first adsorption heat exchanger (51). In the first adsorption heat exchanger (51), moisture is desorbed from the adsorbent heated by the refrigerant and the desorbed moisture is applied to the second air. In other words, the first adsorption heat exchanger (51) performs a regeneration action. The second air given moisture from the first adsorption heat exchanger (51) flows through the first damper (41) into the exhaust-side passage (31), passes through the exhaust fan chamber (35) and is then exhausted through the exhaust opening (21) to the outside.

A description is given of the second mode of the dehumidification operation.

In the refrigerant circuit (50) during the second mode, as shown in FIG. 2B, the four-way selector valve (54) is set to the second position. The refrigerant circuit (50) in this state circulates refrigerant therethrough to operate in a refrigeration cycle. In the refrigerant circuit (50) during this mode, refrigerant discharged from the compressor (53) flows through the second adsorption heat exchanger (52), the motor-operated expansion valve (55) and the first adsorption heat exchanger (51) in this order, the second adsorption heat exchanger (52) serves as a condenser and the first adsorption heat exchanger (51) serves as an evaporator.

Figure 5:
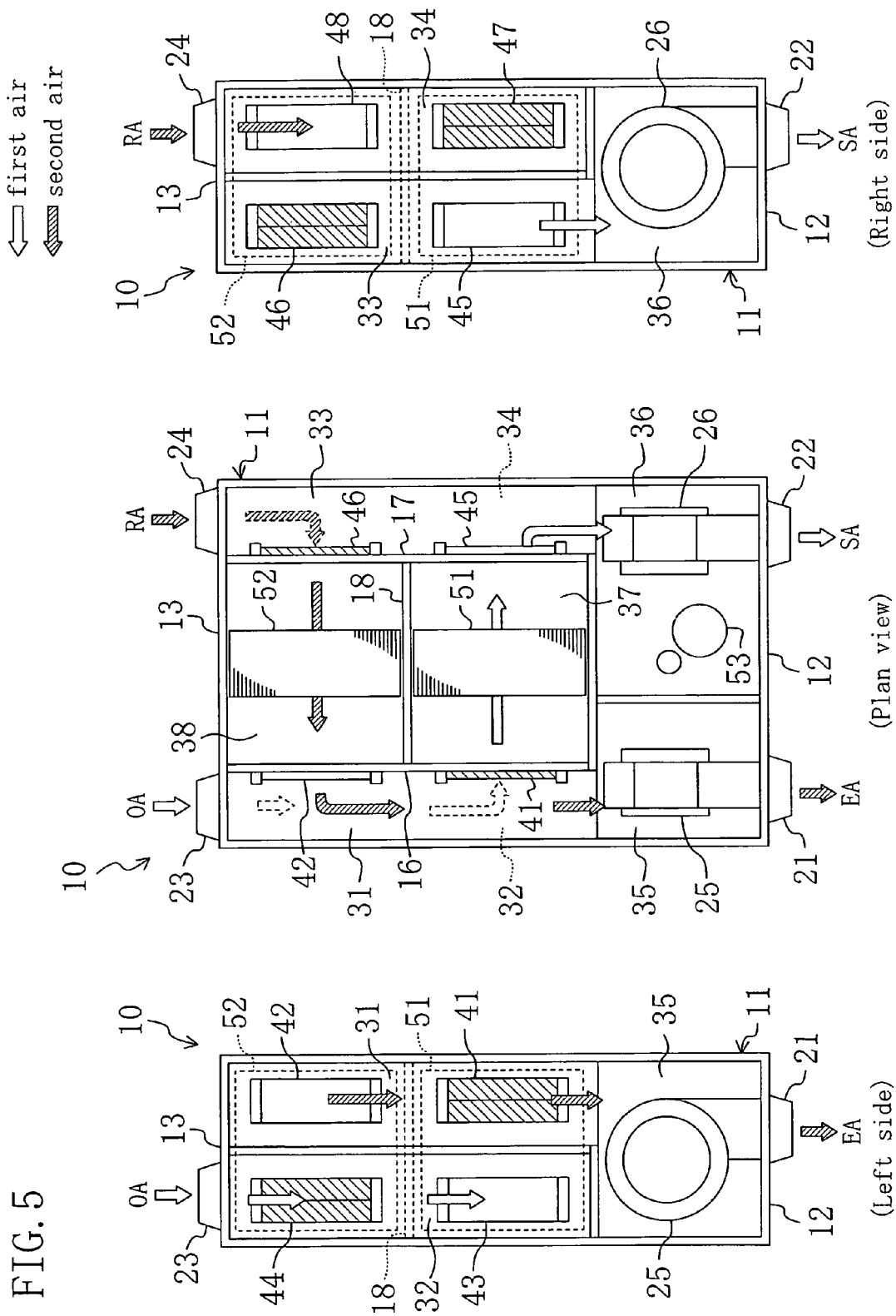
FIG. 5 shows schematic structural diagrams of the humidity control system, illustrating the air flow during the second mode of the dehumidification operation.

During the second mode, as shown in FIG. 5, the second damper (42), the third damper (43), the fifth damper (45) and the eighth damper (48) are open and the rest (41, 44, 46, 47) are closed.

The first air having flowed through the outdoor air suction opening (23) into the outdoor air-side passage (32) flows through the third damper (43) into the first heat exchanger chamber (37) and then passes through the first adsorption heat exchanger (51). In the first adsorption heat exchanger (51), moisture in the first air is adsorbed by the adsorbent and heat of adsorption produced during the moisture adsorption is taken by the refrigerant. In other words, the first adsorption heat exchanger (51) performs an adsorption action. The first air dehumidified by the first adsorption heat exchanger (51) flows through the fifth damper (45) into the air supply-side passage (33), passes through the air supply fan chamber (36) and is then supplied through the air supply opening (22) to the room.

On the other hand, the second air having flowed through the indoor air suction opening (24) into the indoor air-side passage (34) flows through the eighth damper (48) into the second heat exchanger chamber (38) and then passes through the second adsorption heat exchanger (52). In the second adsorption heat exchanger (52), moisture is desorbed from the adsorbent heated by the refrigerant and the desorbed moisture is applied to the second air. In other words, the second adsorption heat exchanger (52) performs a regeneration action. The second air given moisture from the second adsorption heat exchanger (52) flows through the second damper (42) into the exhaust-side passage (31), passes through the exhaust fan chamber (35) and is then exhausted through the exhaust opening (21) to the outside.

<Humidification Operation>

In the humidity control system (10) during humidification operation, the air supply fan (26) and the exhaust fan (27) are driven. When the air supply fan (26) is driven, outdoor air is taken as a second air through the outdoor air suction opening (23) into the casing (11). When the exhaust fan (25) is driven, room air is taken as a first air through the indoor air suction opening (24) into the casing (11). Furthermore, in the humidity control system (10) during humidification operation, first and second modes are alternately repeated at specified time intervals (for example, every three minutes).

A description is given of the first mode of the humidification operation.

In the refrigerant circuit (50) during the first mode, as shown in FIG. 2A, the four-way selector valve (54) is set to the first position. In the refrigerant circuit (50) during this mode, like during the first mode of the dehumidification operation, the first adsorption heat exchanger (51) serves as a condenser and the second adsorption heat exchanger (52) serves as an evaporator.

Figure 6:
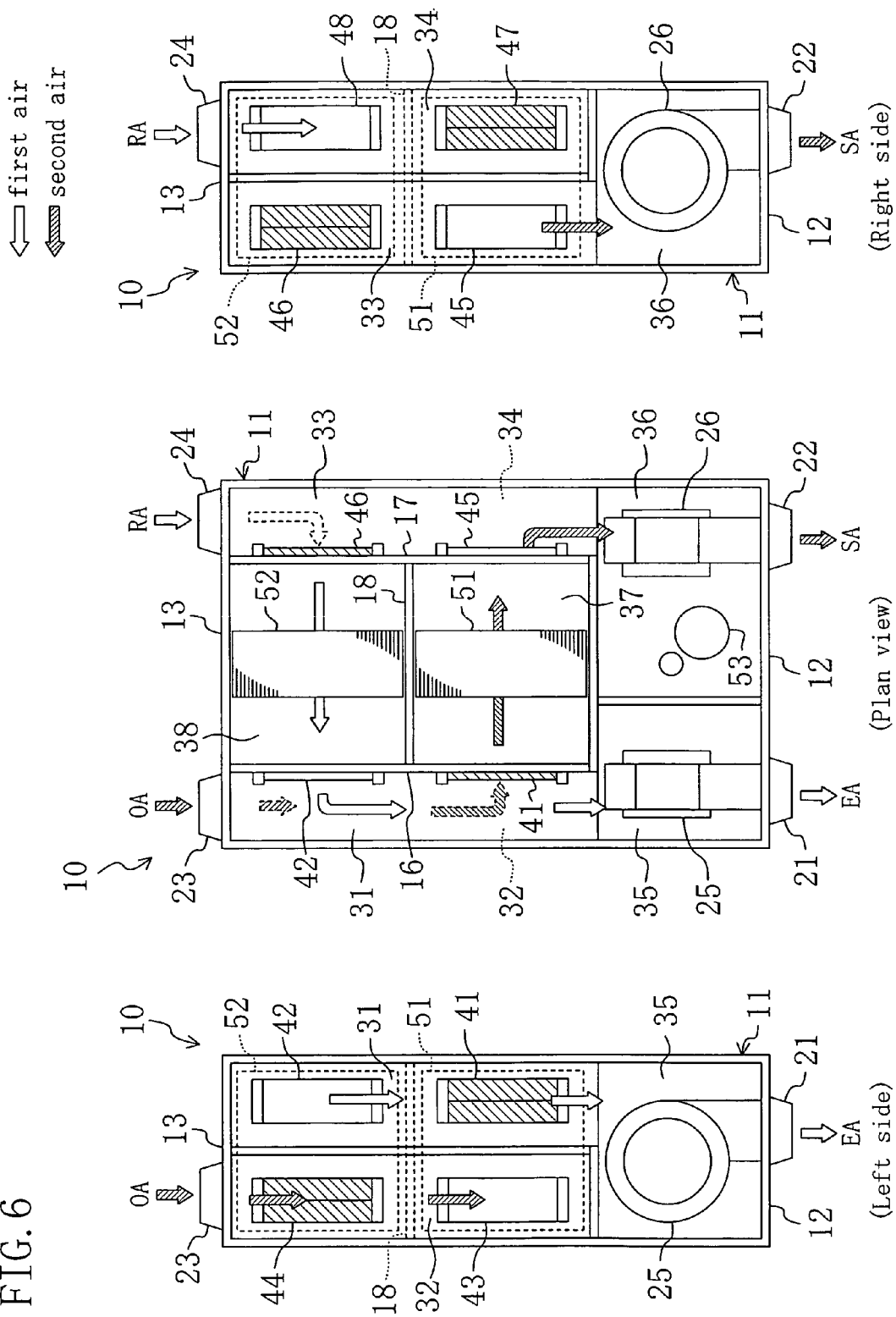
FIG. 6 shows schematic structural diagrams of the humidity control system, illustrating the air flow during the first mode of a humidification operation.

During the first mode, as shown in FIG. 6, the second damper (42), the third damper (43), the fifth damper (45) and the eighth damper (48) are open and the rest (41, 44, 46, 47) are closed.

The first air having flowed through the indoor air suction opening (24) into the indoor air-side passage (34) flows through the eighth damper (48) into the second heat exchanger chamber (38) and then passes through the second adsorption heat exchanger (52). In the second adsorption heat exchanger (52), moisture in the first air is adsorbed by the adsorbent and heat of adsorption produced during the moisture adsorption is taken by the refrigerant. In other words, the second adsorption heat exchanger (52) performs an adsorption action. The first air having given moisture to the second adsorption heat exchanger (52) flows through the second damper (42) into the exhaust-side passage (31), passes through the exhaust fan chamber (35) and is then exhausted through the exhaust opening (21) to the outside.

On the other hand, the second air having flowed through the outdoor air suction opening (23) into the outdoor air-side passage (32) flows through the third damper (43) into the first heat exchanger chamber (37) and then passes through the first adsorption heat exchanger (51). In the first adsorption heat exchanger (51), moisture is desorbed from the adsorbent heated by the refrigerant and the desorbed moisture is applied to the second air. In other words, the first adsorption heat exchanger (51) performs a regeneration action. The second air humidified by the first adsorption heat exchanger (51) flows through the fifth damper (45) into the air supply-side passage (33), passes through the air supply fan chamber (36) and is then supplied through the air supply opening (22) to the room.

A description is given of the second mode of the humidification operation.

In the refrigerant circuit (50) during the second mode, as shown in FIG. 2B, the four-way selector valve (54) is set to the second position. In the refrigerant circuit (50) during this mode, like during the second mode of the dehumidification operation, the second adsorption heat exchanger (52) serves as a condenser and the first adsorption heat exchanger (51) serves as an evaporator.

During the second mode, as shown in FIG. 7, the first damper (41), the fourth damper (44), the sixth damper (46) and the seventh damper (47) are open and the rest (42, 43, 45, 48) are closed.

The first air having flowed through the indoor air suction opening (24) into the indoor air-side passage (34) flows through the seventh damper (47) into the first heat exchanger chamber (37) and then passes through the first adsorption heat exchanger (51). In the first adsorption heat exchanger (51), moisture in the first air is adsorbed by the adsorbent and heat of adsorption produced during the moisture adsorption is taken by the refrigerant. In other words, the first adsorption heat exchanger (51) performs an adsorption action. The first air having given moisture to the first adsorption heat exchanger (51) flows through the first damper (41) into the exhaust-side passage (31), passes through the exhaust fan chamber (35) and is then exhausted through the exhaust opening (21) to the outside.

On the other hand, the second air having flowed through the outdoor air suction opening (23) into the outdoor air-side passage (32) flows through the fourth damper (44) into the second heat exchanger chamber (38) and then passes through the second adsorption heat exchanger (52). In the second adsorption heat exchanger (52), moisture is desorbed from the adsorbent heated by the refrigerant and the desorbed moisture is applied to the second air. In other words, the second adsorption heat exchanger (52) performs a regeneration action. The second air humidified by the second adsorption heat exchanger (52) flows through the sixth damper (46) into the air supply-side passage (33), passes through the air supply fan chamber (36) and is then supplied through the air supply opening (22) to the room.

Flow of Refrigerant and Air in Adsorption Heat Exchanger

Next, a description is given of the relation between air flow and refrigerant flow in the adsorption heat exchangers (51, 52) during each of the dehumidification operation and humidification operation of the above humidity control system (10). In the humidity control system (10) of this embodiment, the flow direction of air passing through each adsorption heat exchanger (51, 52) is reversed between when outdoor air flows into the adsorption heat exchanger (51, 52) and when room air flows into the adsorption heat exchanger (51, 52). Furthermore, the flow direction of refrigerant flowing through each adsorption heat exchanger (51, 52) is reversed between when the adsorption heat exchanger (51, 52) serves as an evaporator in the refrigerant circuit (50) and when it serves as a condenser in the refrigerant circuit (50).

<Dehumidification Operation>

Figure 8A:
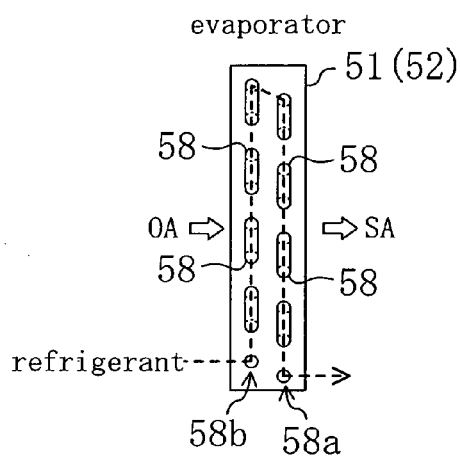
FIG. 8A illustrates the relation during an adsorption action and FIG. 8B illustrates the relation during a regeneration action.

As shown in FIG. 8A, during the above-described adsorption action of the dehumidification operation, outdoor air flows, in the first mode, in the second adsorption heat exchanger (52) serving as an evaporator and is then supplied to the room, while outdoor air flows, in the second mode, in the first adsorption heat exchanger (51) serving as an evaporator and is then supplied to the room. In the adsorption heat exchanger (51, 52) serving as an evaporator, refrigerant flows from the second heat exchange tube part (58b) towards the first heat exchange tube part (58a). Outdoor air passes through the adsorption heat exchanger (51, 52) from its side close to the second heat exchange tube part (58b) towards its side close to the first heat exchange tube part (58a). In other words, in the adsorption heat exchanger (51, 52) during the adsorption action of the dehumidification operation, outdoor air passes from upstream to downstream in the flow of refrigerant to provide so-called parallel flows of air and refrigerant.

Figure 8B:
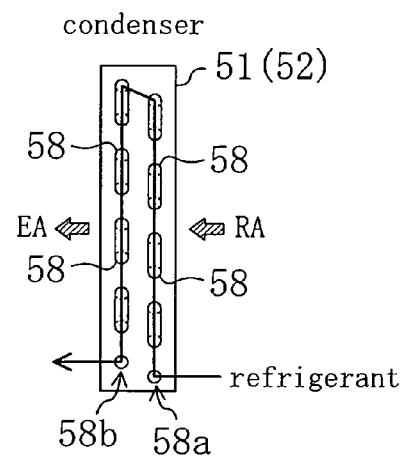

As shown in FIG. 8B, during the above-described regeneration action of the dehumidification operation, room air flows, in the first mode, in the first adsorption heat exchanger (51) serving as a condenser and is then exhausted to the outside, while room air flows, in the second mode, in the second adsorption heat exchanger (52) serving as a condenser and is then exhausted to the outside. In the adsorption heat exchanger (51, 52) serving as a condenser, refrigerant flows from the first heat exchange tube part (58a) towards the second heat exchange tube part (58b). Room air passes through the adsorption heat exchanger (51, 52) from its side close to the first heat exchange tube part (58a) towards its side close to the second heat exchange tube part (58b). In other words, in the adsorption heat exchanger (51, 52) during the regeneration action of the dehumidification operation, room air passes from upstream to downstream in the flow of refrigerant to provide so-called parallel flows of air and refrigerant.

During the dehumidification operation, outdoor air flows in the adsorption heat exchanger (51, 52) serving as an evaporator during the adsorption action from upstream to downstream in the flow of refrigerant. This provides a large temperature difference between outdoor air and refrigerant at the air inflow end of the adsorption heat exchanger (51, 52). As a result, the evaporation temperature of refrigerant at the air inflow end of the adsorption heat exchanger (51, 52) can be reduced to smaller than the dew point of air to condense moisture in air into dew and dehumidify the air. The moisture condensed in dew is recovered into an unshown drain pan provided on the bottom of each adsorption heat exchanger (51, 52) and then discharged to the outside of the humidity control system (10).

<Humidification Operation>

Figure 9A:
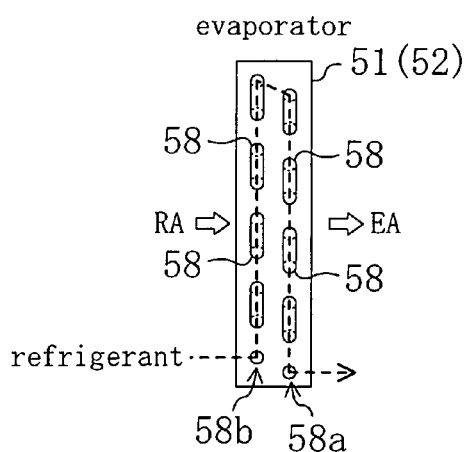
FIG. 9A illustrates the relation during an adsorption action and FIG. 9B illustrates the relation during a regeneration action.

As shown in FIG. 9A, during the above-described adsorption action of the humidification operation, room air flows, in the first mode, in the second adsorption heat exchanger (52) serving as an evaporator and is then exhausted to the outside, while room air flows, in the second mode, in the first adsorption heat exchanger (51) serving as an evaporator and is then exhausted to the outside. In the adsorption heat exchanger (51, 52) serving as an evaporator, refrigerant flows from the second heat exchange tube part (58b) towards the first heat exchange tube part (58a). Room air passes through the adsorption heat exchanger (51, 52) from its side close to the second heat exchange tube part (58b) towards its side close to the first heat exchange tube part (58a). In other words, in the adsorption heat exchanger (51, 52) during the adsorption action of the humidification operation, room air passes from upstream to downstream in the flow of refrigerant to provide so-called parallel flows of air and refrigerant.

Figure 9B:
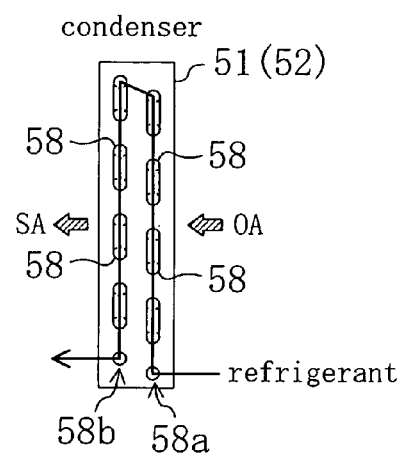

As shown in FIG. 9B, during the above-described regeneration action of the humidification operation, outdoor air flows, in the first mode, in the first adsorption heat exchanger (51) serving as a condenser and is then supplied to the room, while outdoor air flows, in the second mode, in the second adsorption heat exchanger (52) serving as a condenser and is then supplied to the room. In the adsorption heat exchanger (51, 52) serving as a condenser, refrigerant flows from the first heat exchange tube part (58a) towards the second heat exchange tube part (58b). Outdoor air passes through the adsorption heat exchanger (51, 52) from its side close to the first heat exchange tube part (58a) towards its side close to the second heat exchange tube part (58b). In other words, in the adsorption heat exchanger (51, 52) during the regeneration action of the humidification operation, outdoor air passes from upstream to downstream in the flow of refrigerant to provide so-called parallel flows of air and refrigerant.

During the humidification operation, outdoor air flows in the adsorption heat exchanger (51, 52) serving as a condenser during the regeneration action from upstream to downstream in the flow of refrigerant. Therefore, the temperature of refrigerant flowing in the air inflow end of the adsorption heat exchanger (51, 52) becomes relatively high. As a result, outdoor air can be effectively increased in temperature at the air inflow end of the adsorption heat exchanger (51, 52).

Effects of Embodiment 1

According to Embodiment 1, outdoor air flows in the adsorption heat exchanger (51, 52) serving as a condenser during the regeneration action of the humidification operation from upstream to downstream in the flow of refrigerant. Therefore, the air can be effectively increased in temperature at the air inflow end of the adsorption heat exchanger (51, 52). Thus, even when extremely low-temperature outdoor air passes through the adsorption heat exchanger (51, 52) such as in winter, the outdoor air can be increased to a relatively high temperature at the air inflow end of the adsorption heat exchanger (51, 52). Therefore, dew condensation water can be prevented from freezing on the surface of the adsorbent on the adsorption heat exchanger (51, 52), thereby preventing attendant deterioration of the adsorbent and the binder bonding the adsorbent to the heat exchanger body. Hence, the adsorbent can be prevented from peeling off from the adsorption heat exchanger (51, 52), which enhances the reliability of the adsorption heat exchanger (51, 52).

Furthermore, according to Embodiment 1, outdoor air flows in the adsorption heat exchanger (51, 52) serving as an evaporator during the adsorption action of the dehumidification operation from upstream to downstream in the flow of refrigerant. Therefore, moisture in the air can be condensed into dew at the air inflow end of the adsorption heat exchanger (51, 52) to dehumidify the air. Hence, the dehumidification performance of the humidity control system can be enhanced.

Embodiment 2 of the Invention

Figure 10:
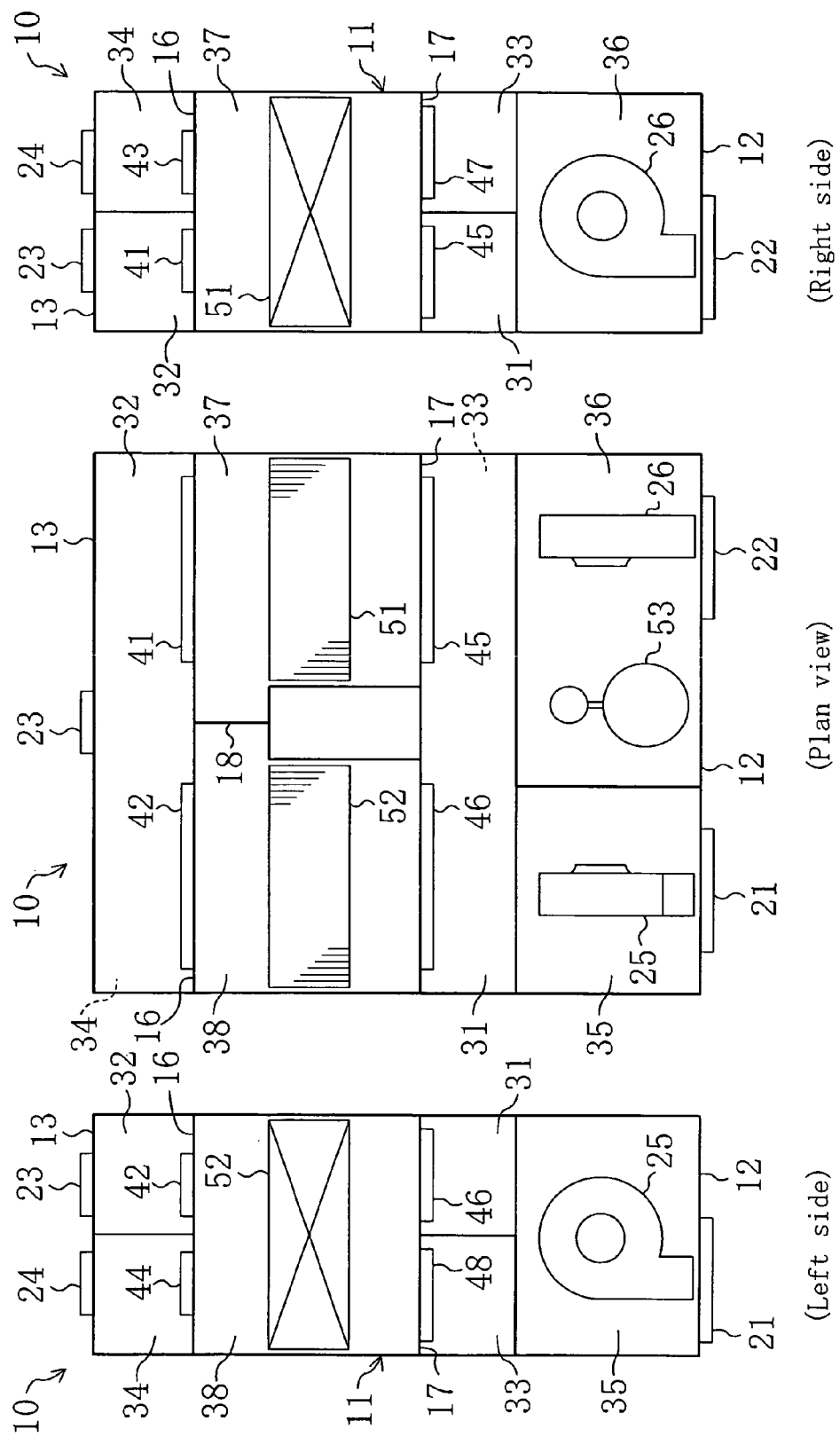
FIG. 10 shows structural diagrams showing a schematic structure of a humidity control system according to Embodiment 2 in plan, right side and left side views.

Embodiment 2 of the invention is described. A humidity control system (10) according to Embodiment 2 is of a different type from Embodiment 1 in arrangements of air passages and adsorption heat exchangers (51, 52). The following description is given of different points from Embodiment 1 with reference to FIG. 10. Note that the following terms employed herein, "upper", "lower", "left", "right", "front", "rear", "on the front of" and "behind", refer to directionalities when the humidity control system (10) is viewed from the front, unless otherwise specified.

The humidity control system (10) includes a casing (11). The casing (11) contains a refrigerant circuit (50) as in Embodiment 1.

The casing (11) is formed in a flattish, relatively small-height, rectangular parallelepiped shape. In the casing (11), a front panel (12) and a rear panel (13) stand up at the front and rear sides, respectively, of the casing (11) as viewed in FIG. 10. The casing (11) in Embodiment 2 is different from that in Embodiment 1 in that its dimension in the front-to-rear direction is approximately equal to its dimension in the left-to-right direction.

The front panel (12) of the casing (11) has an exhaust opening (21) open at a position thereof towards the left side of the casing (11) and an air supply opening (22) open at a position thereof towards the right side of the casing (11). The rear panel (13) of the casing (11) has an outdoor air suction opening (23) open at a laterally middle position thereof towards the top of the casing (11) and an indoor air suction opening (24) open at a laterally middle position thereof towards the bottom of the casing (11).

In a space of the interior of the casing (11) towards the front panel (12), an exhaust fan chamber (35) and an air supply fan chamber (36) are formed like Embodiment 1. On the other hand, the remaining space of the casing (11) is divided from front to rear into three spaces by a first partition plate (16) and a second partition plate (17) both standing up in the casing (11). These partition plates (16, 17) extend in the left-to-right direction of the casing (11). The first partition plate (16) and the second partition plate (17) are disposed towards the rear panel (13) and the front panel (12), respectively.

In the interior of the casing (11), the space behind the first partition plate (16) is divided from top to bottom into two subspaces. The upper subspace forms an outdoor air-side passage (32) and the lower subspace forms an indoor air-side passage (34). The outdoor air-side passage (32) is communicated through the outdoor air suction opening (23) with the outside. The indoor air-side passage (34) is communicated through the indoor air suction opening (24) with the room. On the other hand, the space on the front of the second partition plate (17) is divided from top to bottom into two subspaces. The upper subspace forms an exhaust-side passage (31) and the lower subspace forms an air supply-side passage (33). The exhaust-side passage (31) is communicated with the exhaust fan chamber (35). The air supply-side passage (33) is communicated with the air supply fan chamber (36).

The space between the first partition plate (16) and the second partition plate (17) is further divided from left to right into two subspaces by a middle partition plate (18). The subspace on the right side of the middle partition plate (18) forms a first heat exchanger chamber (37) and the subspace on the left side thereof forms a second heat exchanger chamber (38). The first heat exchanger chamber (37) contains the first adsorption heat exchanger (51) and the second heat exchanger chamber (38) contains the second adsorption heat exchanger (52). These two adsorption heat exchangers (51, 52) are placed to extend laterally across the heat exchanger chambers (37, 38) containing them.

Each adsorption heat exchanger (51, 52) is configured like Embodiment 1 (see FIG. 3). Each adsorption heat exchanger (51, 52) stands up in the associated heat exchanger chamber (37, 38) so that its first heat exchange tube part (58a) is located towards the outdoor air-side passage (32) and the indoor air-side passage (34) and its second heat exchange tube part (58b) is located towards the exhaust-side passage (31) and the air supply-side passage (33).

The first partition plate (16) is provided with four on-off dampers (41-44). Specifically, the first damper (41) is attached to an upper right portion of the first partition plate (16), the second damper (42) is attached to an upper left portion thereof, the third damper (43) is attached to a lower right portion thereof, and the fourth damper (44) is attached to a lower left portion thereof. When the first damper (41) is turned open, the outdoor air-side passage (32) is communicated with the first heat exchanger chamber (37). When the second damper (42) is turned open, the outdoor air-side passage (32) is communicated with the second heat exchanger chamber (38). When the third damper (43) is turned open, the indoor air-side passage (34) is communicated with the first heat exchanger chamber (37). When the fourth damper (44) is turned open, the indoor air-side passage (34) is communicated with the second heat exchanger chamber (38).

The second partition plate (17) is provided with four on-off dampers (45-48). Specifically, the fifth damper (45) is attached to an upper right portion of the second partition plate (17), the sixth damper (46) is attached to an upper left portion thereof, the seventh damper (47) is attached to a lower right portion thereof, and the eighth damper (48) is attached to a lower left portion thereof. When the fifth damper (45) is turned open, the exhaust-side passage (31) is communicated with the first heat exchanger chamber (37). When the sixth damper (46) is turned open, the exhaust-side passage (31) is communicated with the second heat exchanger chamber (38). When the seventh damper (47) is turned open, the air supply-side passage (33) is communicated with the first heat exchanger chamber (37). When the eighth damper (48) is turned open, the air supply-side passage (33) is communicated with the second heat exchanger chamber (38).

Operational Behavior

The humidity control system (10) of this embodiment performs a dehumidification operation and a humidification operation, like Embodiment 1.

<Dehumidification Operation>

In the first mode during the dehumidification operation, the four-way selector valve (54) of the refrigerant circuit (50) is set to the first position as shown in FIG. 2A. In the refrigerant circuit (50) during this mode, the first adsorption heat exchanger (51) serves as a condenser and the second adsorption heat exchanger (52) serves as an evaporator.

Figure 11:
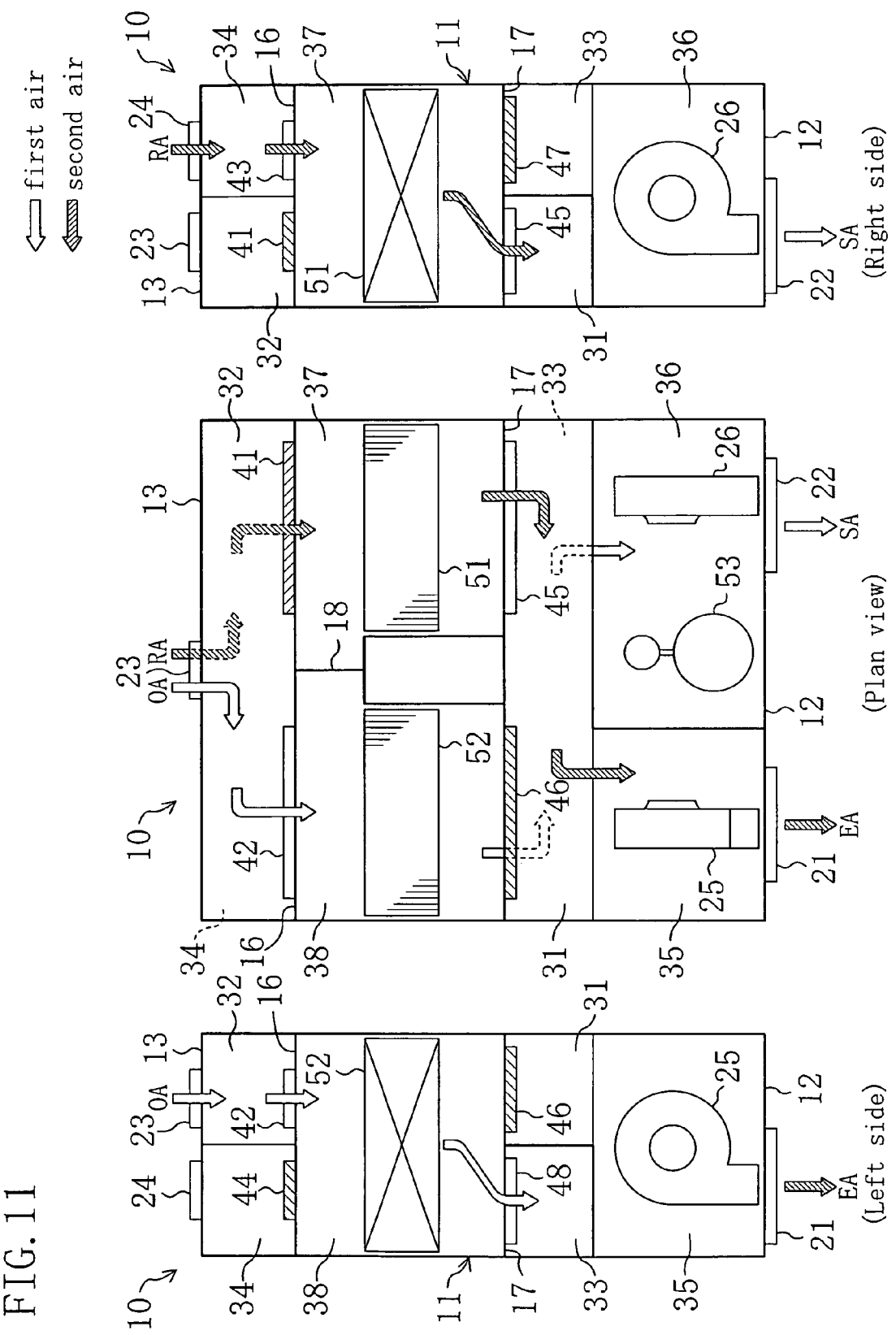
FIG. 11 shows schematic structural diagrams of the humidity control system, illustrating the air flow during the first mode of a dehumidification operation.

During the first mode, as shown in FIG. 11, the second damper (42), the third damper (43), the fifth damper (45) and the eighth damper (48) are open and the rest (41, 44, 46, 47) are closed.

Outdoor air flows as a first air through the outdoor air suction opening (23) into the outdoor air-side passage (32). The first air flows through the second damper (42) into the second heat exchanger chamber (38) and then passes through the second adsorption heat exchanger (52). The second adsorption heat exchanger (52) performs an adsorption action, like Embodiment 1. The first air dehumidified by the second adsorption heat exchanger (52) flows through the eighth damper (48) into the air supply-side passage (33), passes through the air supply fan chamber (36) and is then supplied through the air supply opening (22) to the room.

Room air flows as a second air through the indoor air suction opening (24) into the indoor air-side passage (34). The second air flows through the third damper (43) into the first heat exchanger chamber (37) and then passes through the first adsorption heat exchanger (51). The first adsorption heat exchanger (51) performs a regeneration action, like Embodiment 1. The second air given moisture from the first adsorption heat exchanger (51) flows through the fifth damper (45) into the exhaust-side passage (31), passes through the exhaust fan chamber (35) and is then exhausted through the exhaust opening (21) to the outside.

In the second mode during the dehumidification operation, the four-way selector valve (54) of the refrigerant circuit (50) is set to the second position as shown in FIG. 2B. In the refrigerant circuit (50) during this mode, the second adsorption heat exchanger (52) serves as a condenser and the first adsorption heat exchanger (51) serves as an evaporator.

Figure 12:
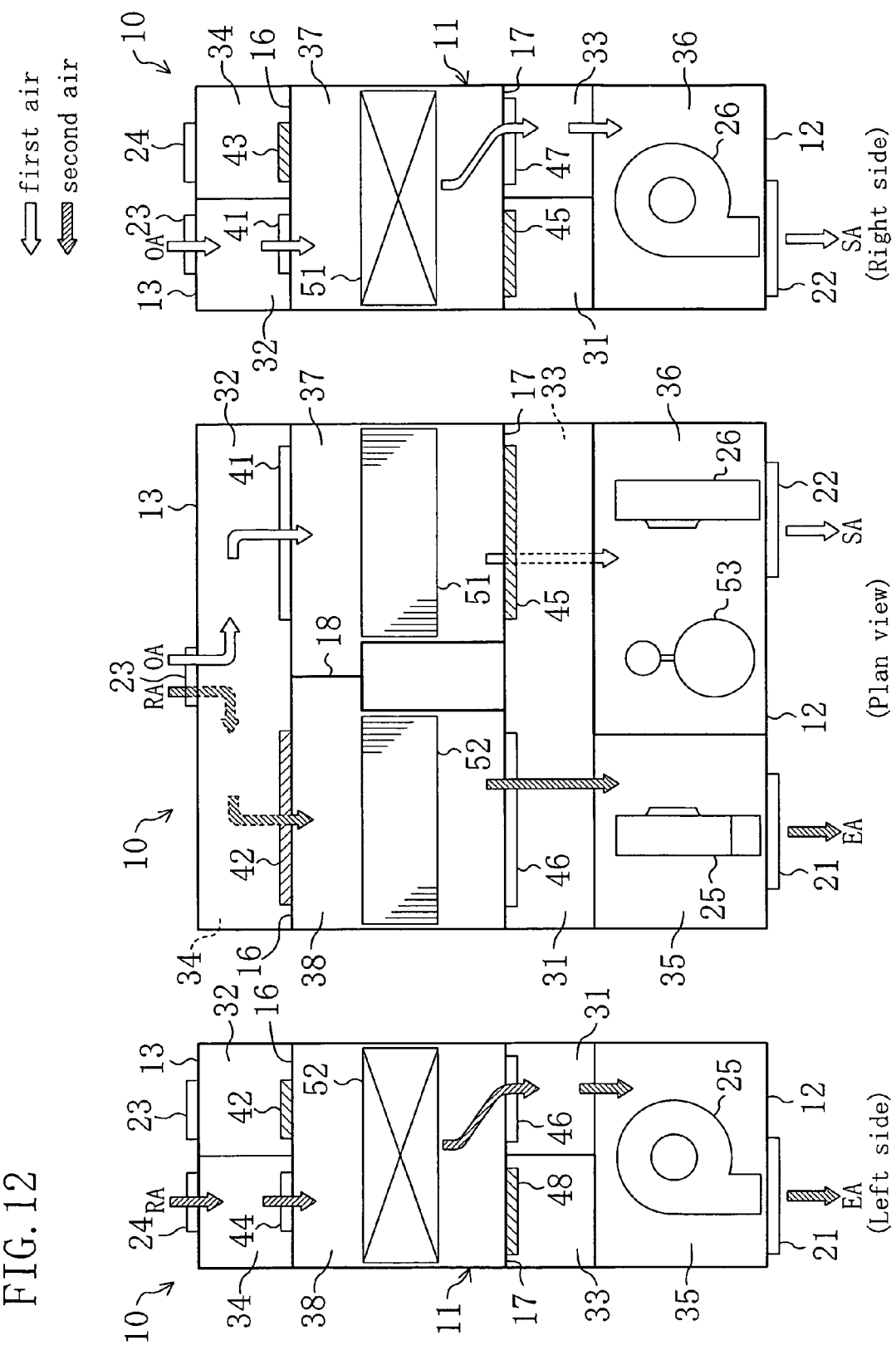
FIG. 12 shows schematic structural diagrams of the humidity control system, illustrating the air flow during the second mode of the dehumidification operation.

During the second mode, as shown in FIG. 12, the first damper (41), the fourth damper (44), the sixth damper (46) and the seventh damper (47) are open and the rest (42, 43, 45, 48) are closed.

Outdoor air flows as a first air through the outdoor air suction opening (23) into the outdoor air-side passage (32). The first air flows through the first damper (41) into the first heat exchanger chamber (37) and then passes through the first adsorption heat exchanger (51). The first adsorption heat exchanger (51) performs an adsorption action. The first air dehumidified by the first adsorption heat exchanger (51) flows through the seventh damper (47) into the air supply-side passage (33), passes through the air supply fan chamber (36) and is then supplied through the air supply opening (22) to the room.

Room air flows as a second air through the indoor air suction opening (24) into the indoor air-side passage (34). The second air flows through the fourth damper (44) into the second heat exchanger chamber (38) and then passes through the second adsorption heat exchanger (52). The second adsorption heat exchanger (52) performs a regeneration action. The second air given moisture from the second adsorption heat exchanger (52) flows through the sixth damper (46) into the exhaust-side passage (31), passes through the exhaust fan chamber (35) and is then exhausted through the exhaust opening (21) to the outside.

<Humidification Operation>

In the first mode during the humidification operation, the four-way selector valve (54) of the refrigerant circuit (50) is set to the first position as shown in FIG. 2A. In the refrigerant circuit (50) during this mode, the first adsorption heat exchanger (51) serves as a condenser and the second adsorption heat exchanger (52) serves as an evaporator.

Figure 13:
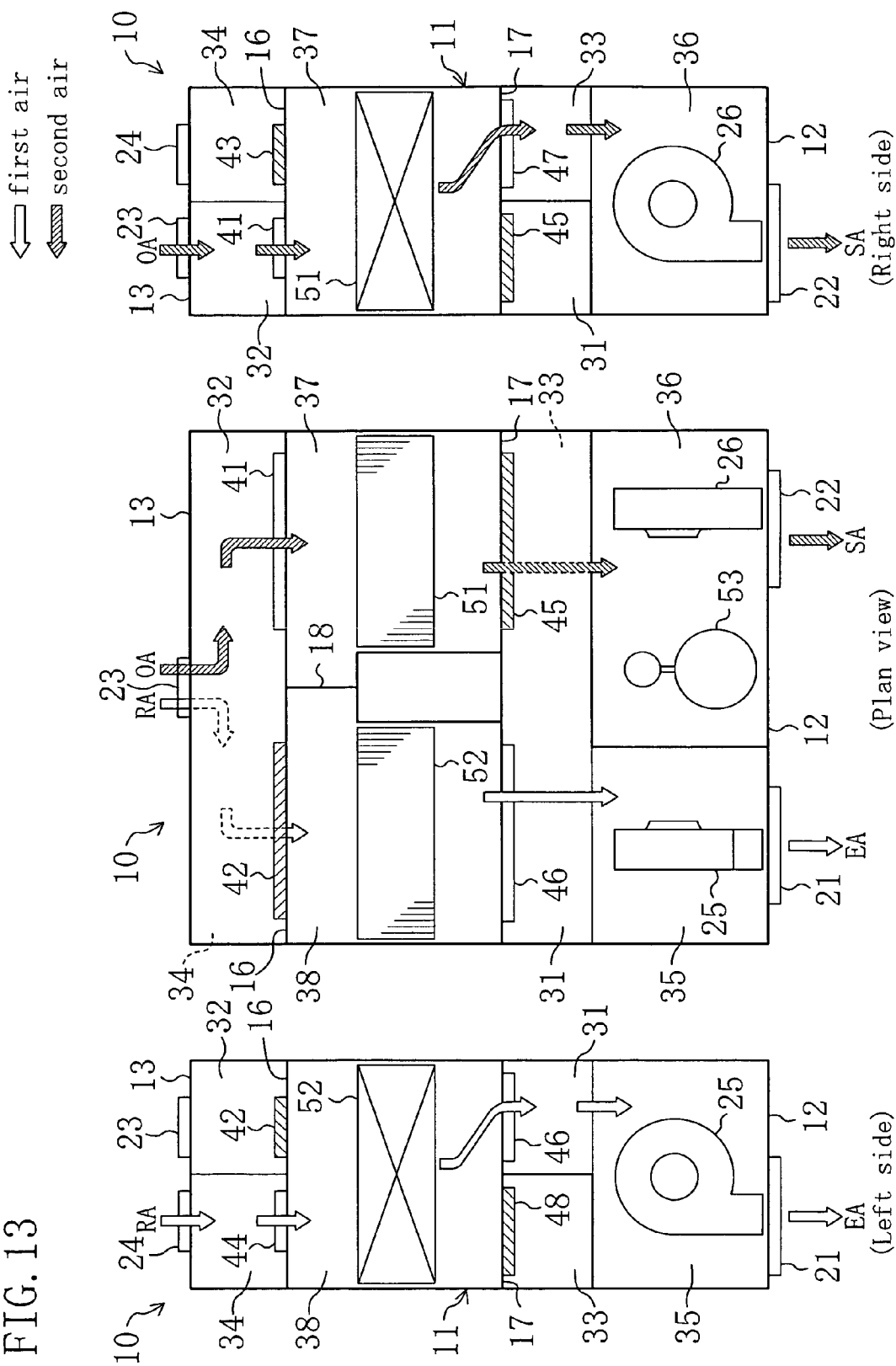
FIG. 13 shows schematic structural diagrams of the humidity control system, illustrating the air flow during the first mode of a humidification operation.

During the first mode, as shown in FIG. 13, the first damper (41), the fourth damper (44), the sixth damper (46) and the seventh damper (47) are open and the rest (42, 43, 45, 48) are closed.

Outdoor air flows as a second air through the outdoor air suction opening (23) into the outdoor air-side passage (32). The second air flows through the first damper (41) into the first heat exchanger chamber (37) and then passes through the first adsorption heat exchanger (51). The first adsorption heat exchanger (51) performs an adsorption action. The second air dehumidified by the first adsorption heat exchanger (51) flows through the seventh damper (47) into the air supply-side passage (33), passes through the air supply fan chamber (36) and is then supplied through the air supply opening (22) to the room.

Room air flows as a first air through the indoor air suction opening (24) into the indoor air-side passage (34). The first air flows through the fourth damper (44) into the second heat exchanger chamber (38) and then passes through the second adsorption heat exchanger (52). The second adsorption heat exchanger (52) performs a regeneration action. The first air given moisture from the second adsorption heat exchanger (52) flows through the sixth damper (46) into the exhaust-side passage (31), passes through the exhaust fan chamber (35) and is then exhausted through the exhaust opening (21) to the outside.

In the second mode during the dehumidification operation, the four-way selector valve (54) of the refrigerant circuit (50) is set to the second position as shown in FIG. 2B. In the refrigerant circuit (50) during this mode, the second adsorption heat exchanger (52) serves as a condenser and the first adsorption heat exchanger (51) serves as an evaporator.

Figure 14:
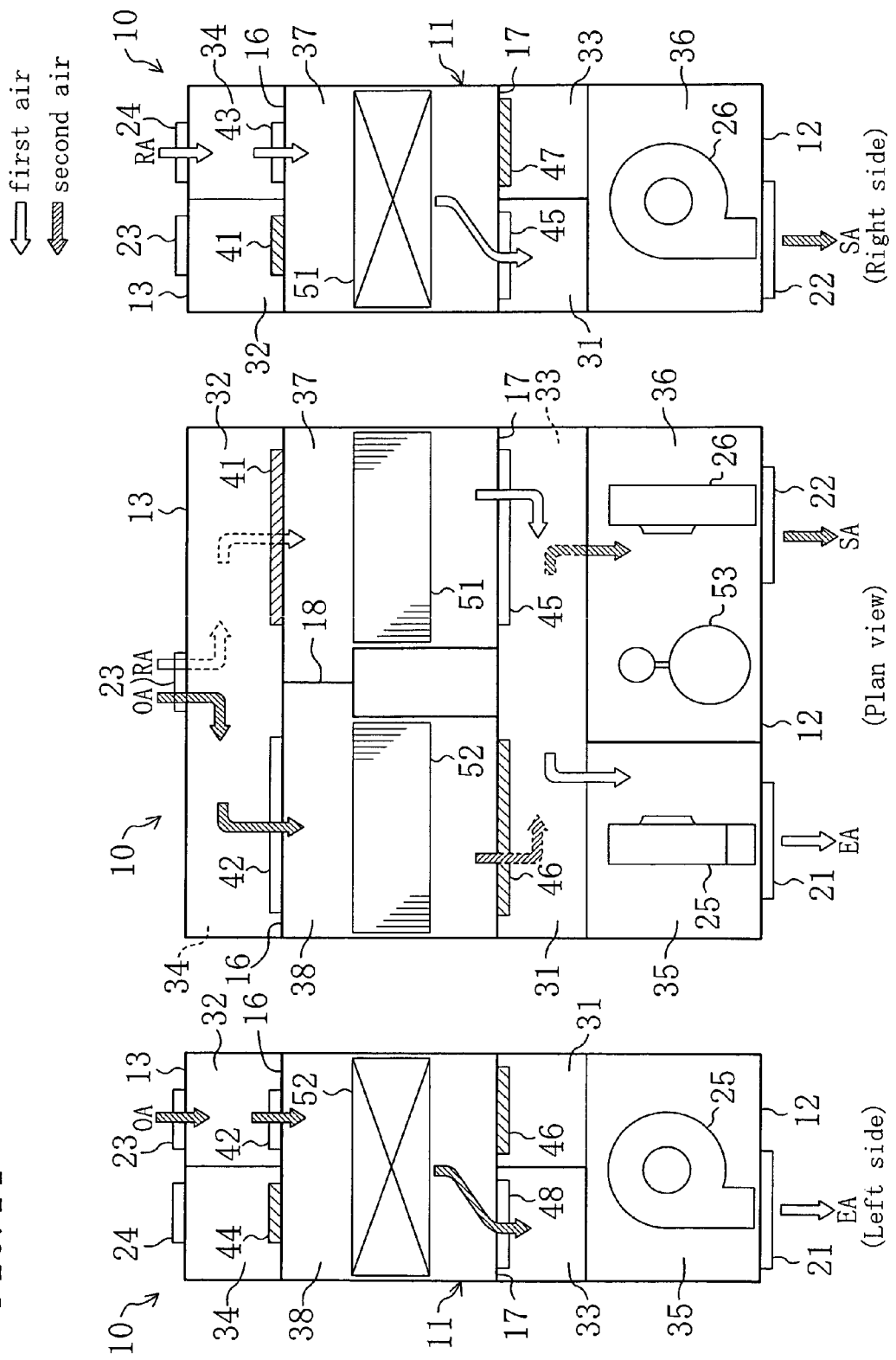
FIG. 14 shows schematic structural diagrams of the humidity control system, illustrating the air flow during the second mode of the humidification operation.

During the second mode, as shown in FIG. 14, the second damper (42), the third damper (43), the fifth damper (45) and the eighth damper (48) are open and the rest (41, 44, 46, 47) are closed.

Outdoor air flows as a second air through the outdoor air suction opening (23) into the outdoor air-side passage (32). The second air flows through the second damper (42) into the second heat exchanger chamber (38) and then passes through the second adsorption heat exchanger (52). The second adsorption heat exchanger (52) performs an adsorption action. The second air dehumidified by the second adsorption heat exchanger (52) flows through the eighth damper (48) into the air supply-side passage (33), passes through the air supply fan chamber (36) and is then supplied through the air supply opening (22) to the room.

Room air flows as a first air through the indoor air suction opening (24) into the indoor air-side passage (34). The first air flows through the third damper (43) into the first heat exchanger chamber (37) and then passes through the first adsorption heat exchanger (51). The first adsorption heat exchanger (51) performs a regeneration action. The first air given moisture from the first adsorption heat exchanger (51) flows through the fifth damper (45) into the exhaust-side passage (31), passes through the exhaust fan chamber (35) and is then exhausted through the exhaust opening (21) to the outside.

Flow of Refrigerant and Air in Adsorption Heat Exchanger

Next, a description is given of the relation between air flow and refrigerant flow in the adsorption heat exchangers (51, 52) during each of the dehumidification operation and humidification operation of the humidity control system (10) according to Embodiment 2. In the humidity control system (10) of this embodiment, the flow direction of air passing through each adsorption heat exchanger (51, 52) when outdoor air flows into the adsorption heat exchanger (51, 52) is the same as that when room air flows into the adsorption heat exchanger (51, 52). On the other hand, the flow direction of refrigerant flowing through each adsorption heat exchanger (51, 52) is reversed between when the adsorption heat exchanger (51, 52) serves as an evaporator in the refrigerant circuit (50) and when it serves as a condenser in the refrigerant circuit (50).

<Dehumidification Operation>

Figure 15A:
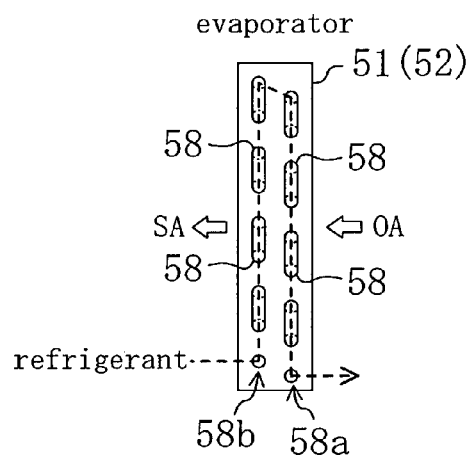
FIG. 15A illustrates the relation during an adsorption action and FIG. 15B illustrates the relation during a regeneration action.

As shown in FIG. 15A, during the above-described adsorption action of the dehumidification operation, refrigerant flows in the adsorption heat exchanger (51, 52) serving as an evaporator from the second heat exchange tube part (58b) towards the first heat exchange tube part (58a). On the other hand, outdoor air passes through the adsorption heat exchanger (51, 52) from its side close to the first heat exchange tube part (58a) towards its side close to the second heat exchange tube part (58b). In other words, in the adsorption heat exchanger (51, 52) during the adsorption action of the dehumidification operation, outdoor air passes from downstream to upstream in the flow of refrigerant to provide so-called counter flows of air and refrigerant.

Figure 15B:
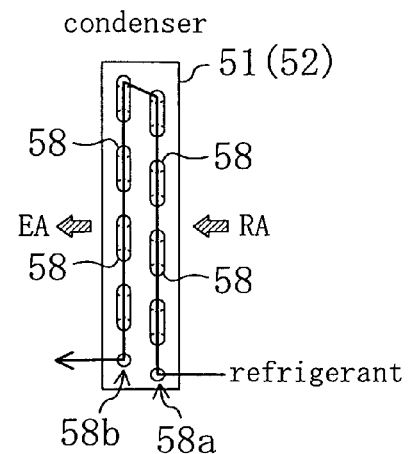

As shown in FIG. 15B, during the above-described regeneration action of the dehumidification operation, refrigerant flows in the adsorption heat exchanger (51, 52) serving as a condenser from the first heat exchange tube part (58a) towards the second heat exchange tube part (58b). Room air passes through the adsorption heat exchanger (51, 52) from its side close to the first heat exchange tube part (58a) towards its side close to the second heat exchange tube part (58b). In other words, in the adsorption heat exchanger (51, 52) during the regeneration action of the dehumidification operation, air passes from upstream to downstream in the flow of refrigerant to provide so-called parallel flows of air and refrigerant.

During the dehumidification operation, outdoor air flows in the adsorption heat exchanger (51, 52) during the adsorption action from downstream to upstream in the flow of refrigerant. This provides a certain degree of temperature difference between air and refrigerant over the entire region of air flow in the adsorption heat exchanger (51, 52) from upstream end to downstream end thereof. As a result, air can be effectively cooled by the adsorption heat exchanger (51, 52).

<Humidification Operation>

Figure 16A:
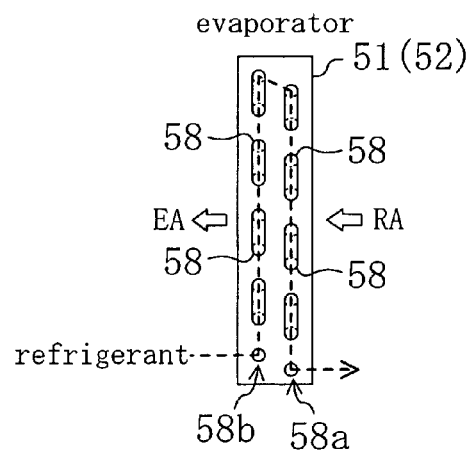
FIG. 16A illustrates the relation during an adsorption action and FIG. 16B illustrates the relation during a regeneration action.

As shown in FIG. 16A, during the above-described adsorption action of the humidification operation, refrigerant flows in the adsorption heat exchanger (51, 52) serving as an evaporator from the second heat exchange tube part (58b) towards the first heat exchange tube part (58a). On the other hand, room air passes through the adsorption heat exchanger (51, 52) from its side close to the first heat exchange tube part (58a) towards its side close to the second heat exchange tube part (58b). In other words, in the adsorption heat exchanger (51, 52) during the adsorption action of the humidification operation, air passes from downstream to upstream in the flow of refrigerant to provide so-called counter flows of air and refrigerant.

Figure 16B:
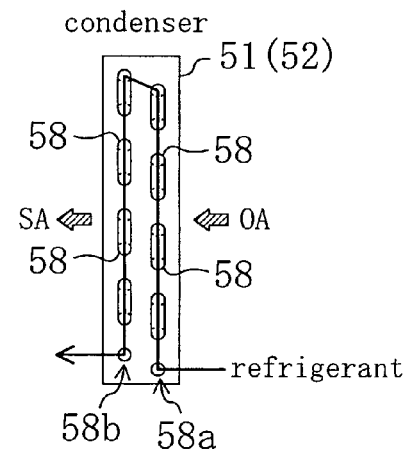

As shown in FIG. 16B, during the above-described regeneration action of the humidification operation, refrigerant flows in the adsorption heat exchanger (51, 52) serving as a condenser from the first heat exchange tube part (58a) towards the second heat exchange tube part (58b). Outdoor air passes through the adsorption heat exchanger (51, 52) from its side close to the first heat exchange tube part (58a) towards its side close to the second heat exchange tube part (58b). In other words, in the adsorption heat exchanger (51, 52) during the regeneration action of the humidification operation, air passes from upstream to downstream in the flow of refrigerant to provide so-called parallel flows of air and refrigerant.

During the humidification operation, like Embodiment 1, outdoor air flows in the adsorption heat exchanger (51, 52) serving as a condenser during the regeneration action from upstream to downstream in the flow of refrigerant. Therefore, relatively high-temperature refrigerant flows in the air inflow end of the adsorption heat exchanger (51, 52). As a result, outdoor air can be effectively increased in temperature at the air inflow end of the adsorption heat exchanger (51, 52).

Effects of Embodiment 2

According to Embodiment 2, like according to Embodiment 1, outdoor air flows in the adsorption heat exchanger (51, 52) during the regeneration action of the humidification operation from upstream to downstream in the flow of refrigerant. Therefore, air can be effectively increased in temperature at the air inflow end of the adsorption heat exchanger (51, 52). Hence, dew condensation water can be prevented from freezing on the surface of the adsorbent on the adsorption heat exchanger (51, 52).

Furthermore, according to Embodiment 2, outdoor air flows in the adsorption heat exchanger (51, 52) during the adsorption action of the dehumidification operation from downstream to upstream in the flow of refrigerant. Therefore, air can be effectively cooled by the adsorption heat exchanger (51, 52). Hence, room can be effectively cooled by the humidity control system (10), for example, during a dehumidification operation in summer.

Modification of Embodiment 2

Figure 17A:
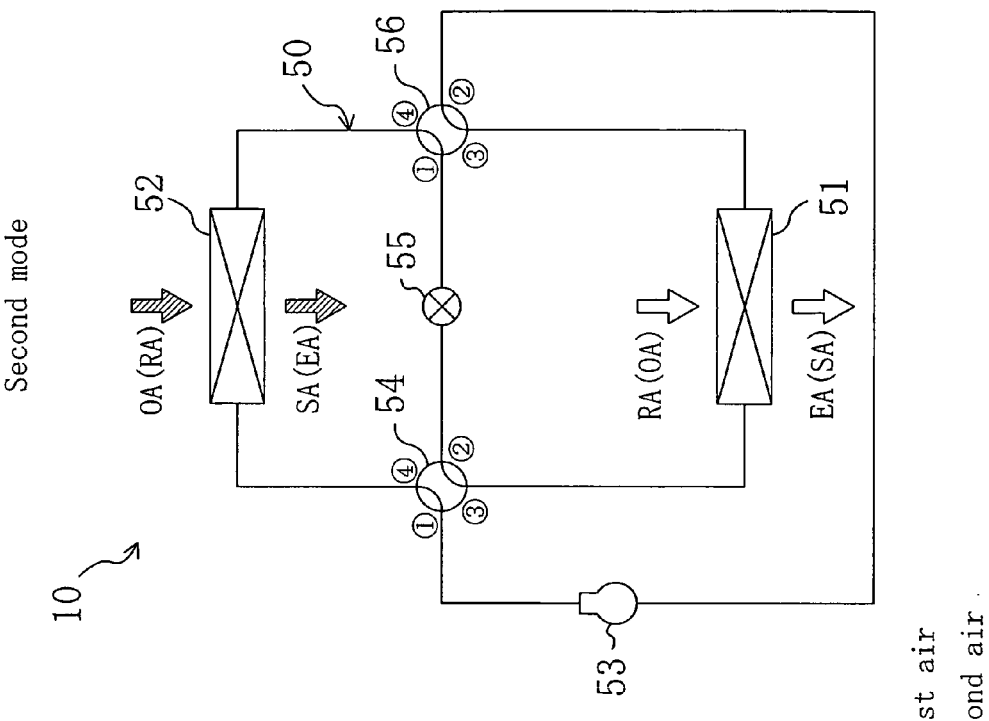
FIG. 17A illustrates the behavior during a first mode and FIG. 17B illustrates the behavior during a second mode.

Instead of the refrigerant circuit of Embodiment 2, a refrigerant circuit (50) shown in FIG. 17 may be applied to the humidity control system (10). In the refrigerant circuit (50) of this modification, a second four-way selector valve (56) is connected in addition to the elements of the refrigerant circuit (50) of the above embodiment.

In the refrigerant circuit (50), the compressor (53) is connected at its discharge side to a first port of a first four-way selector valve (54) and connected at its suction side to a second port of the second four-way selector valve (56). The first adsorption heat exchanger (51) is connected at one end to a third port of the first four-way selector valve (54) and connected at the other end to a third port of the second four-way selector valve (56). The second adsorption heat exchanger (52) is connected at one end to a fourth port of the first four-way selector valve (54) and connected at the other end to a fourth port of the second four-way selector valve (56). A second port of the first four-way selector valve (54) is connected via the motor-operated expansion valve (55) to a first port of the second four-way selector valve (56).

Figure 17B:
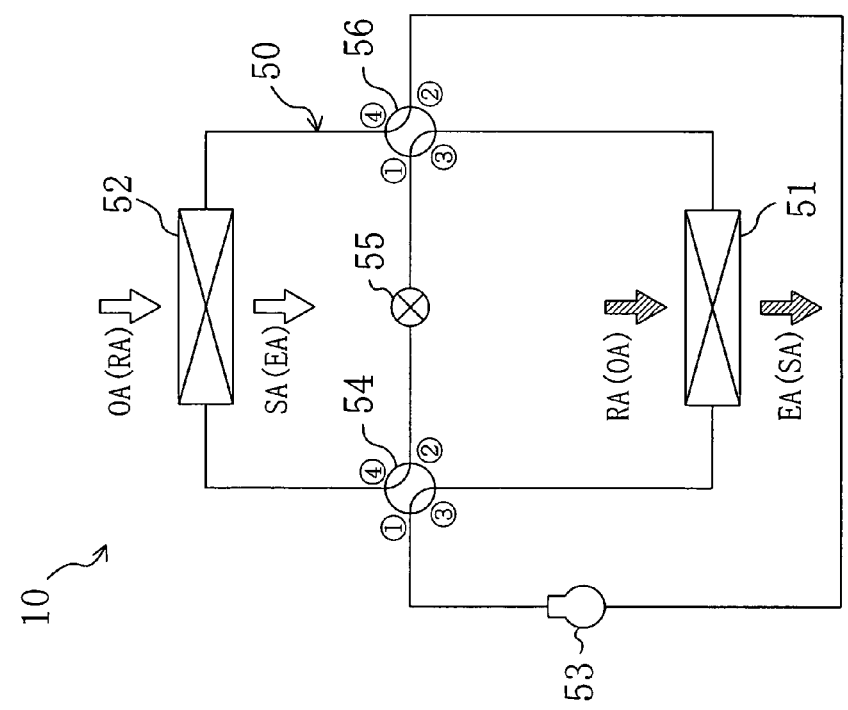

Each of these four-way selector valves (54, 56) is switchable between a first position in which the first and third ports are communicated with each other and the second and fourth ports are communicated with each other (the position shown in FIG. 17A) and a second position in which the first and fourth ports are communicated with each other and the second and third ports are communicated with each other (the position shown in FIG. 17B).

In the humidity control system (10) according to the modification of Embodiment 2, in either case where both the four-way selector valves (54, 56) are changed to their first positions or their second positions, both the adsorption heat exchangers (51, 52) have the same flow direction of refrigerant flowing therethrough. In other words, in this humidity control system (10), the flow direction of refrigerant when each adsorption heat exchanger (51, 52) serves as an evaporator is the same as that when the adsorption heat exchanger (51, 52) serves as a condenser. In addition, in this humidity control system (10), the flow direction of air passing through each adsorption heat exchanger (51, 52) when outdoor air flows into the adsorption heat exchanger (51, 52) is the same as that when room air flows into the adsorption heat exchanger (51, 52).

Figure 18A:
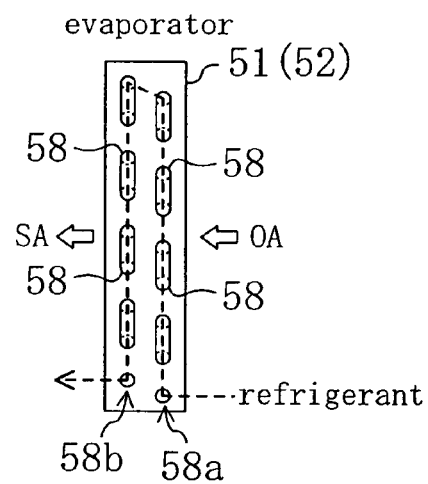
FIG. 18A illustrates the relation during an adsorption action and FIG. 18B illustrates the relation during a regeneration action.
Figure 18B:
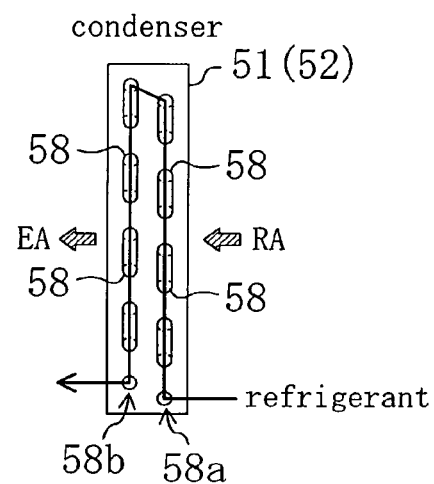
Figure 19A:
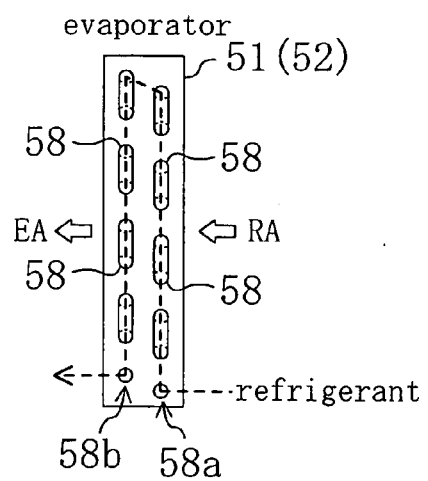
FIG. 19A illustrates the relation during an adsorption action and FIG. 19B illustrates the relation during a regeneration action.
Figure 19B:
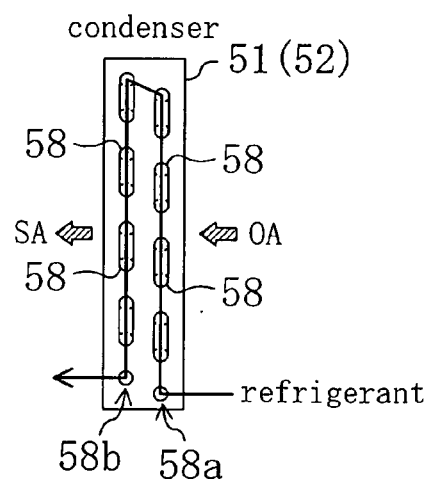

Therefore, in the adsorption heat exchanger (51, 52) during the dehumidification operation, air and refrigerant flow in parallel with each other in both the adsorption action shown in FIG. 18A and the regeneration action shown in FIG. 18B. Furthermore, in the adsorption heat exchanger (51, 52) during the humidification operation, air and refrigerant flow in parallel with each other in both the adsorption action shown in FIG. 19A and the regeneration action shown in FIG. 19B.

Hence, during the regeneration action of the humidification operation, air can be effectively heated at the air inflow end of the adsorption heat exchanger (51, 52), whereby dew condensation water can be prevented from freezing on the surface of the adsorbent on the adsorption heat exchanger (51, 52). Furthermore, during adsorption action of the dehumidification operation, moisture in the air can be condensed into dew at the air inflow end of the adsorption heat exchanger (51, 52), whereby the dehumidification performance of the humidity control system can be enhanced.

Other Embodiments

The above embodiments may have the following structure.

In the above embodiments, each heat exchanger chamber (37, 38) contains a single adsorption heat exchanger (51, 52). However, a plurality of adsorption heat exchangers are juxtaposed in the heat exchanger chamber. In an example shown in FIG. 20, two adsorption heat exchangers are juxtaposed in the direction of air flow. The refrigerant in the refrigerant circuit (50) first flows as two branch flows one into each of the adsorption heat exchangers (51, 52), and the two flows of refrigerant flow out of them and then join together again. In this case, as compared with the case where refrigerant flows sequentially into the adsorption heat exchangers (51, 52), pressure loss in the refrigerant piping can be reduced.

Figure 20:
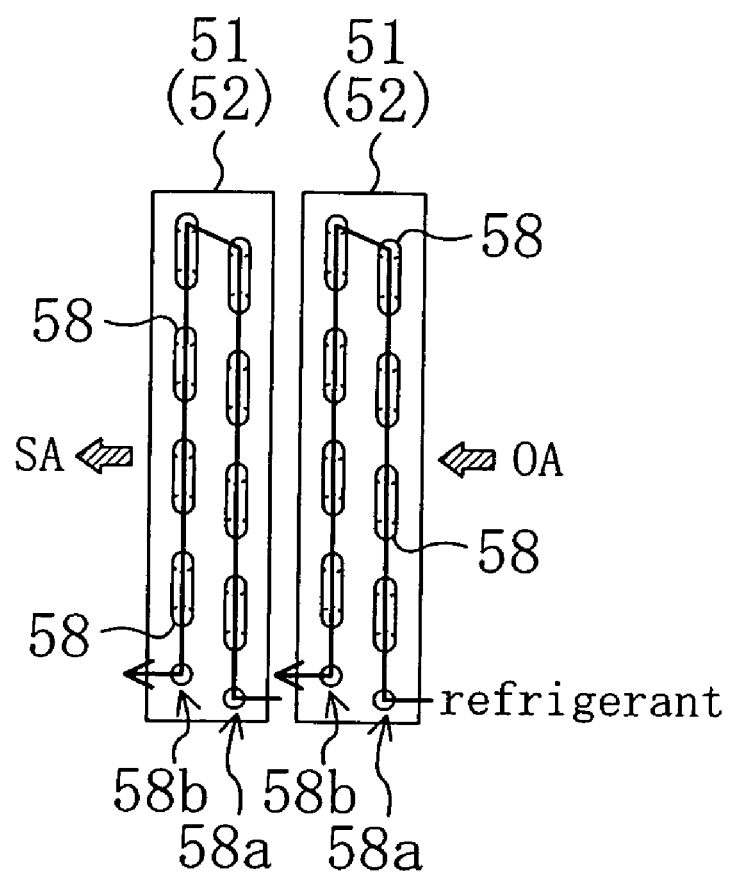
FIG. 20 is a schematic structural diagram showing an adsorption heat exchanger in another embodiment.

Also in the example shown in FIG. 20, if outdoor air is allowed to flow in each adsorption heat exchanger (51, 52) serving as a condenser from upstream to downstream in the flow of refrigerant, the outdoor air can be effectively increased in temperature at the air inflow end of the adsorption heat exchanger (51) disposed upstream of the other adsorption heat exchanger (52). Therefore, dew condensation water can be prevented from freezing on each adsorption heat exchanger (51, 52).

The above embodiments are merely illustrative in nature and are not intended to limit the scope, applications and use of the invention.

INDUSTRIAL APPLICABILITY

As can be seen from the above description, the present invention is useful for humidity control systems capable of regenerating the adsorbents on their adsorption heat exchangers by bringing them into contact with air.

The invention claimed is:

1. A humidity control system that includes a heat transfer medium circuit filled with heat transfer medium flowing therethrough and an adsorption heat exchanger connected in the heat transfer medium circuit and carrying an adsorbent thereon and is configured to perform a regeneration action of heating the adsorbent on the adsorption heat exchanger with the heat transfer medium in the heat transfer medium circuit and bringing the adsorbent into contact with air to release moisture in the adsorbent to the air, wherein
the adsorption heat exchanger is configured so that, during the regeneration action, the air flows from a side thereof into which the heat transfer medium flows towards a side thereof out of which the heat transfer medium flows.

2. The humidity control system of claim 1, wherein
the humidity control system is configured to perform an adsorption action of cooling the adsorbent on the adsorption heat exchanger with the heat transfer medium and bringing the adsorbent into contact with air to adsorb moisture in the air to the adsorbent, and
the adsorption heat exchanger is configured so that, during the adsorption action, the air flows from a side thereof into which the heat transfer medium flows towards a side thereof out of which the heat transfer medium flows.

3. The humidity control system of claim 1, wherein
the humidity control system is configured to perform an adsorption action of cooling the adsorbent on the adsorption heat exchanger with the heat transfer medium and bringing the adsorbent into contact with air to adsorb moisture in the air to the adsorbent, and
the adsorption heat exchanger is configured so that, during the adsorption action, the air flows from a side thereof out of which the heat transfer medium flows towards a side thereof into which the heat transfer medium flows.

4. The humidity control system of any one of claims 1 to 3, wherein the heat transfer medium circuit comprises a refrigerant circuit operating in a refrigeration cycle by circulating refrigerant as the heat transfer medium therethrough.

5. The humidity control system of any one of claims 1 to 3, wherein
the adsorption heat exchanger is configured so that, during the regeneration action, outdoor air flows from a side thereof into which the heat transfer medium flows towards a side thereof out of which the heat transfer medium flows.

6. The humidity control system of claim 4, wherein
the adsorption heat exchanger is configured so that, during the regeneration action, outdoor air flows from a side thereof into which the heat transfer medium flows towards a side thereof out of which the heat transfer medium flows.

* * * * *